(12) United States Patent
Susienka et al.

(10) Patent No.: US 12,172,108 B2
(45) Date of Patent: Dec. 24, 2024

(54) CLOSED BIOPROCESSING DEVICE

(71) Applicant: EMD Millipore Corporation, Burlington, MA (US)

(72) Inventors: Michael James Susienka, Burlington, MA (US); Jeremy Perreault, Burlington, MA (US); Joseph Geringer, Burlington, MA (US); Brian Hillier, Burlington, MA (US); Joseph Muldoon, Burlington, MA (US); John Paul Amara, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 920 days.

(21) Appl. No.: 17/262,356

(22) PCT Filed: Aug. 12, 2019

(86) PCT No.: PCT/US2019/046159
§ 371 (c)(1),
(2) Date: Jan. 22, 2021

(87) PCT Pub. No.: WO2020/036869
PCT Pub. Date: Feb. 20, 2020

(65) Prior Publication Data
US 2021/0322901 A1 Oct. 21, 2021

Related U.S. Application Data

(60) Provisional application No. 62/837,236, filed on Apr. 23, 2019, provisional application No. 62/719,014, filed on Aug. 16, 2018.

(51) Int. Cl.
*B01D 63/08* (2006.01)
*B01D 27/14* (2006.01)
*B01D 35/30* (2006.01)

(52) U.S. Cl.
CPC ........... *B01D 27/148* (2013.01); *B01D 35/30* (2013.01); *B01D 63/082* (2013.01);
(Continued)

(58) Field of Classification Search
CPC .... B01D 27/148; B01D 35/30; B01D 63/082; B01D 63/084; B01D 2201/302;
(Continued)

(56) References Cited

U.S. PATENT DOCUMENTS 2,579,932 A    12/1951   Kobernick
4,274,939 A *   6/1981   Bjaareklint ............... C25B 9/77
                                                    204/263

(Continued)

FOREIGN PATENT DOCUMENTS

AU    2003236421 B2    9/2003
BR    PI0205629 A      8/2004
(Continued)

OTHER PUBLICATIONS

English language machine translation of SE412855B, 4 Pages, No Date.*
(Continued)

*Primary Examiner* — Pranav N Patel
(74) *Attorney, Agent, or Firm* — NIELDS, LEMACK & FRAME, LLC

(57) ABSTRACT

A filtration module is provided, the module including at least one filtration packet containing filtration media or one or more membranes, such as a stack of membranes, the at least one filtration packet having one or more fluid ports, the one or more fluid ports being surrounded by a primary seal and a secondary seal spaced from the primary seal. The secondary seals are designed to maintain sterility of the assembly
(Continued)

during shipping, handling and/or installation. A removable film may cover one or more fluid ports to maintain sterility prior to use.

17 Claims, 23 Drawing Sheets

(52) U.S. Cl.
CPC ...... *B01D 63/084* (2013.01); *B01D 2201/302* (2013.01); *B01D 2201/308* (2013.01); *B01D 2201/34* (2013.01); *B01D 2313/041* (2022.08); *B01D 2313/042* (2022.08); *B01D 2313/105* (2013.01); *B01D 2313/125* (2013.01); *B01D 2313/14* (2013.01); *B01D 2313/21* (2013.01); *B01D 2313/44* (2013.01); *B01D 2317/02* (2013.01)

(58) Field of Classification Search
CPC .......... B01D 2201/308; B01D 2201/34; B01D 2313/041; B01D 2313/042; B01D 2313/105; B01D 2313/125; B01D 2313/14; B01D 2313/21; B01D 2313/44; B01D 2317/02; B01D 27/14; B01D 2201/605; B01D 2313/54; B01D 2313/04; B01D 63/08; B01D 63/081; B01D 63/0822; B01D 63/087; B01D 63/088; B01D 2201/304
See application file for complete search history.

(56) References Cited

U.S. PATENT DOCUMENTS

| | | |
|---|---|---|
| 4,624,784 A | 11/1986 | Lefebvre |
| 4,931,175 A | 6/1990 | Krofta |
| 5,143,630 A | 9/1992 | Rolchigo |
| 5,186,821 A | 2/1993 | Murphy |
| 5,211,847 A | 5/1993 | Kanow |
| 5,232,589 A | 8/1993 | Kopf |
| 5,258,127 A | 11/1993 | Gsell et al. |
| 5,324,483 A | 6/1994 | Cody et al. |
| 5,403,479 A | 4/1995 | Smith et al. |
| 5,462,867 A | 10/1995 | Azad et al. |
| 5,472,605 A | 12/1995 | Zuk |
| 5,549,828 A | 8/1996 | Ehrlich |
| 5,571,408 A | 11/1996 | Rising |
| 5,658,458 A | 8/1997 | Keyser et al. |
| 5,899,915 A | 5/1999 | Saadat |
| 5,961,829 A | 10/1999 | Schnorr et al. |
| 6,309,597 B1 | 10/2001 | Ballinger, Jr. et al. |
| 6,698,383 B1 | 3/2004 | Terwort et al. |
| 6,767,463 B1 | 7/2004 | Bender et al. |
| 6,997,883 B1 | 2/2006 | Hahn |
| 8,650,839 B1 | 2/2014 | Robinson et al. |
| 8,936,724 B2 | 1/2015 | Hunt |
| 9,764,965 B1 | 9/2017 | Nohren |
| 10,005,697 B1 * | 6/2018 | Vander Hoff ........ B01D 61/146 |
| 10,006,074 B2 | 6/2018 | Robinson et al. |
| 10,007,940 B2 | 6/2018 | Sines et al. |
| 10,010,611 B2 | 7/2018 | Gokarn et al. |
| 10,010,724 B2 | 7/2018 | Barthe et al. |
| 10,010,888 B2 | 7/2018 | Williams et al. |
| 10,017,908 B2 | 7/2018 | Torres |
| 2001/0009754 A1 | 7/2001 | Dragan et al. |
| 2001/0018447 A1 | 8/2001 | Widdowson et al. |
| 2001/0021803 A1 | 9/2001 | Blank et al. |
| 2001/0034058 A1 | 10/2001 | Kopf |
| 2001/0036672 A1 | 11/2001 | Anderson et al. |
| 2001/0055462 A1 | 12/2001 | Seibel |
| 2002/0007510 A1 | 1/2002 | Mann |
| 2002/0029580 A1 | 3/2002 | Faqih |
| 2002/0031562 A1 | 3/2002 | Ribnicky et al. |
| 2002/0036175 A1 | 3/2002 | Held et al. |
| 2002/0045811 A1 | 4/2002 | Kittrell et al. |
| 2002/0046569 A1 | 4/2002 | Faqih |
| 2002/0049374 A1 | 4/2002 | Abreu |
| 2002/0068924 A1 | 6/2002 | Sinofsky |
| 2002/0069429 A1 | 6/2002 | Kumagai et al. |
| 2002/0097633 A1 | 7/2002 | Karp et al. |
| 2002/0110915 A1 | 8/2002 | Shaaltiel |
| 2002/0117445 A1 | 8/2002 | Whiteman |
| 2002/0127546 A1 | 9/2002 | Anderson et al. |
| 2002/0131892 A1 | 9/2002 | Glattstein et al. |
| 2002/0160941 A1 | 10/2002 | Kruzel |
| 2002/0160976 A1 | 10/2002 | Miles et al. |
| 2002/0170859 A1 | 11/2002 | Kopf |
| 2002/0173627 A1 | 11/2002 | Davis et al. |
| 2002/0177215 A1 | 11/2002 | Zhang et al. |
| 2002/0182627 A1 | 12/2002 | Wang et al. |
| 2002/0186261 A1 | 12/2002 | Giles et al. |
| 2002/0198372 A1 | 12/2002 | Bridenbaugh et al. |
| 2003/0010698 A1 | 1/2003 | Fritze |
| 2003/0029783 A1 | 2/2003 | Donald et al. |
| 2003/0030011 A1 | 2/2003 | Brown et al. |
| 2003/0045925 A1 | 3/2003 | Jayaraman |
| 2003/0129741 A1 | 7/2003 | Ramstad |
| 2003/0136731 A1 | 7/2003 | Mandt |
| 2003/0187227 A1 | 10/2003 | Lihme et al. |
| 2003/0205538 A1 | 11/2003 | Dorian et al. |
| 2003/0215894 A1 | 11/2003 | Niman |
| 2004/0015075 A1 | 1/2004 | Kimchy et al. |
| 2004/0028727 A1 | 2/2004 | Glenn et al. |
| 2004/0060437 A1 | 4/2004 | Frost et al. |
| 2004/0071767 A1 | 4/2004 | Cevc et al. |
| 2004/0141880 A1 | 7/2004 | Handler et al. |
| 2004/0210194 A1 | 10/2004 | Bonnette et al. |
| 2004/0245124 A1 | 12/2004 | Hurst |
| 2004/0245180 A1 | 12/2004 | De Oliveira et al. |
| 2004/0247490 A1 | 12/2004 | Olivier et al. |
| 2005/0038074 A1 | 2/2005 | Coleman et al. |
| 2005/0051486 A1 | 3/2005 | Zuk |
| 2005/0061737 A1 | 3/2005 | Linden et al. |
| 2005/0107377 A1 | 5/2005 | Shutske et al. |
| 2005/0173632 A1 | 8/2005 | Behar et al. |
| 2005/0197687 A1 | 9/2005 | Molaei et al. |
| 2006/0024286 A1 | 2/2006 | Glidden |
| 2006/0099705 A1 | 5/2006 | Wikswo et al. |
| 2006/0113235 A1 | 6/2006 | Strohm et al. |
| 2006/0134798 A1 | 6/2006 | Geraci et al. |
| 2006/0151051 A1 | 7/2006 | Py et al. |
| 2006/0253086 A1 | 11/2006 | Moberg et al. |
| 2006/0286920 A1 | 12/2006 | Flitsch et al. |
| 2007/0000838 A1 | 1/2007 | Shih et al. |
| 2007/0037192 A1 | 2/2007 | Ziomek et al. |
| 2007/0045178 A1 | 3/2007 | Brase |
| 2007/0126794 A1 | 6/2007 | Schick et al. |
| 2007/0166266 A1 | 7/2007 | Dillon et al. |
| 2007/0171366 A1 | 7/2007 | Su et al. |
| 2007/0183935 A1 | 8/2007 | Clemmens et al. |
| 2007/0202581 A1 | 8/2007 | Herrema et al. |
| 2007/0203727 A1 | 8/2007 | Moore |
| 2008/0020002 A1 | 1/2008 | Reddy |
| 2008/0213877 A1 | 9/2008 | Hicks |
| 2008/0269851 A1 | 10/2008 | Deem et al. |
| 2008/0272023 A1 | 11/2008 | McCormick et al. |
| 2009/0041626 A1 | 2/2009 | Atkin |
| 2009/0062909 A1 | 3/2009 | Taylor et al. |
| 2009/0117642 A1 | 5/2009 | Power et al. |
| 2010/0021993 A1 | 1/2010 | Wang et al. |
| 2010/0022513 A1 | 1/2010 | Forster et al. |
| 2010/0040646 A1 | 2/2010 | Nassal et al. |
| 2010/0062483 A1 | 3/2010 | Beliaev et al. |
| 2010/0112001 A1 | 5/2010 | Djurup et al. |
| 2010/0120129 A1 | 5/2010 | Amshey et al. |
| 2010/0140161 A1 | 6/2010 | Haynes et al. |
| 2010/0209428 A1 | 8/2010 | Hiruma et al. |
| 2010/0303827 A1 | 12/2010 | Sharma et al. |
| 2010/0311156 A1 | 12/2010 | Beliaev et al. |
| 2011/0019851 A1 | 1/2011 | Michel et al. |
| 2011/0053224 A1 | 3/2011 | Lo et al. |
| 2011/0084013 A1 | 4/2011 | Lesan et al. |
| 2011/0117639 A1 | 5/2011 | Suazo et al. |

(56) References Cited

U.S. PATENT DOCUMENTS

| | | |
|---|---|---|
| 2011/0158988 A1 | 6/2011 | Uhlen et al. |
| 2011/0168611 A1 | 7/2011 | Early et al. |
| 2011/0189344 A1 | 8/2011 | Bodo et al. |
| 2011/0198286 A1 | 8/2011 | Niazi |
| 2011/0229517 A1 | 9/2011 | Strahlendorf |
| 2011/0258837 A1 | 10/2011 | Scannon et al. |
| 2011/0262408 A1 | 10/2011 | Nemunaitis et al. |
| 2011/0284438 A1 | 11/2011 | Jowett et al. |
| 2012/0006891 A1 | 1/2012 | Zhou et al. |
| 2012/0010390 A1 | 1/2012 | Van Alstine et al. |
| 2012/0022239 A1 | 1/2012 | Van Alstine et al. |
| 2012/0045826 A1 | 2/2012 | Yantz et al. |
| 2012/0071324 A1 | 3/2012 | Uhr et al. |
| 2012/0080361 A1 | 4/2012 | Walavalkar et al. |
| 2012/0234752 A1 | 9/2012 | Dunn |
| 2012/0255642 A1 | 10/2012 | Gebauer |
| 2012/0258459 A1 | 10/2012 | Huang |
| 2012/0270305 A1 | 10/2012 | Williamson et al. |
| 2012/0277548 A1 | 11/2012 | Burton |
| 2012/0281218 A1 | 11/2012 | Schnitzer et al. |
| 2013/0001174 A1 | 1/2013 | Zacharias et al. |
| 2013/0012689 A1 | 1/2013 | Singh et al. |
| 2013/0043190 A1 | 2/2013 | Al-Samadi |
| 2013/0153494 A1 | 6/2013 | Wang et al. |
| 2013/0164731 A1 | 6/2013 | Cimino et al. |
| 2013/0183660 A1 | 7/2013 | Yu et al. |
| 2013/0196375 A1 | 8/2013 | Strobbe |
| 2013/0196841 A1 | 8/2013 | Dobrowolski |
| 2013/0224816 A1 | 8/2013 | Elliott et al. |
| 2013/0284271 A1 | 10/2013 | Lipkens et al. |
| 2013/0286380 A1 | 10/2013 | Selker et al. |
| 2013/0306897 A1* | 11/2013 | Hillier ............... G01N 15/0826 137/884 |
| 2014/0069344 A1 | 3/2014 | Lipscomb et al. |
| 2014/0093952 A1 | 4/2014 | Serway |
| 2014/0142464 A1 | 5/2014 | Harms et al. |
| 2014/0255994 A1 | 9/2014 | Konstantinov et al. |
| 2014/0288185 A1 | 9/2014 | Akireddy et al. |
| 2014/0349382 A1 | 11/2014 | Thomson et al. |
| 2015/0041376 A1 | 2/2015 | Fulford |
| 2015/0051199 A1 | 2/2015 | Woodhead et al. |
| 2015/0083654 A1 | 3/2015 | Cartwright et al. |
| 2015/0086591 A1 | 3/2015 | Eldridge et al. |
| 2015/0132742 A1 | 5/2015 | Thuo et al. |
| 2015/0133643 A1 | 5/2015 | Cheng et al. |
| 2015/0151989 A1 | 6/2015 | Merayo et al. |
| 2015/0165353 A1* | 6/2015 | Lambalot ............... B01D 29/88 210/252 |
| 2015/0166379 A1 | 6/2015 | Graves |
| 2015/0216545 A1 | 8/2015 | Anderson et al. |
| 2015/0232911 A1 | 8/2015 | Rowlen et al. |
| 2015/0247210 A1 | 9/2015 | Olesberg et al. |
| 2016/0051935 A1 | 2/2016 | Li et al. |
| 2016/0116439 A1 | 4/2016 | Kindwall et al. |
| 2016/0123978 A1 | 5/2016 | Dormale et al. |
| 2016/0137727 A1 | 5/2016 | Le et al. |
| 2016/0207808 A1 | 7/2016 | Roldan |
| 2016/0222429 A1 | 8/2016 | De Villiers et al. |
| 2016/0287693 A1 | 10/2016 | Norman et al. |
| 2016/0304373 A1 | 10/2016 | Daglish |
| 2016/0305574 A1 | 10/2016 | Burdge et al. |
| 2016/0333304 A1 | 11/2016 | Leibnitz et al. |
| 2016/0361715 A1 | 12/2016 | Shi et al. |
| 2017/0014502 A1 | 1/2017 | Sumathy et al. |
| 2017/0056788 A1* | 3/2017 | Liu ............... B01D 15/166 |
| 2017/0095667 A1 | 4/2017 | Yakovlev et al. |
| 2017/0157435 A1 | 6/2017 | Choi |
| 2017/0204361 A1 | 7/2017 | Eapen et al. |
| 2017/0327867 A1 | 11/2017 | Dohale et al. |
| 2018/0015189 A1 | 1/2018 | Castan et al. |
| 2018/0038838 A1 | 2/2018 | Karancsi et al. |
| 2018/0049725 A1 | 2/2018 | Jones et al. |
| 2018/0169610 A1 | 6/2018 | Chodavarapu et al. |

FOREIGN PATENT DOCUMENTS

| | | |
|---|---|---|
| BR | PI0706144 A2 | 3/2009 |
| CN | 201427954 Y | 3/2010 |
| CN | 201433144 Y | 3/2010 |
| CN | 201697805 U | 1/2011 |
| CN | 201933158 U | 8/2011 |
| CN | 102367869 A | 3/2012 |
| CN | 103193324 A | 7/2013 |
| CN | 103723856 A | 4/2014 |
| CN | 203853365 U | 10/2014 |
| CN | 204275579 U | 4/2015 |
| CN | 204503090 U | 7/2015 |
| CN | 105399617 A | 3/2016 |
| CN | 205205094 U | 5/2016 |
| CN | 205269235 U | 6/2016 |
| CN | 106315909 A | 1/2017 |
| CN | 206214461 U | 6/2017 |
| CN | 207512026 U | 6/2018 |
| CO | 4790153 A1 | 5/1999 |
| CO | 4990964 A1 | 12/2000 |
| CO | 4990970 A1 | 12/2000 |
| CO | 5590124 U | 12/2005 |
| CO | 6110139 A1 | 12/2009 |
| DE | 2365749 A1 | 8/1976 |
| DE | 239583 A1 | 10/1986 |
| DE | 3540508 A1 | 5/1987 |
| DE | 19647512 A1 | 5/1998 |
| DE | 19616747 A1 | 8/1998 |
| DE | 19749530 A1 | 5/1999 |
| DE | 19800224 C1 | 5/1999 |
| DE | 19908781 A1 | 8/2000 |
| DE | 19954437 A1 | 5/2001 |
| DE | 20116953 U1 | 1/2002 |
| DE | 10220106 A1 | 11/2003 |
| DE | 10259914 A1 | 7/2004 |
| DE | 102008017909 A1 | 10/2009 |
| DE | 102016101350 B3 | 2/2017 |
| DE | 102016012676 A1 | 10/2017 |
| EP | 1462519 A1 | 9/2004 |
| EP | 1516857 A1 | 3/2005 |
| EP | 1973635 B1 | 6/2011 |
| FR | 2822150 A1 | 9/2002 |
| FR | 2870466 A1 | 11/2005 |
| GB | 1532102 A | 11/1978 |
| GB | 2456333 A | 1/2008 |
| IN | 1096/MUM/2005 A | 4/2010 |
| IN | 201721031296 A | 11/2017 |
| JP | 2015-519196 A | 7/2015 |
| MX | 2014008261 A | 1/2016 |
| MX | 2016011912 A | 5/2017 |
| SE | 412855 B * | 3/1980 |
| SE | 523718 C2 | 5/2004 |
| UY | 4496 U | 1/2014 |
| UY | 4555 U | 9/2015 |
| WO | 92/06150 A1 | 4/1992 |
| WO | 95/09176 A1 | 4/1995 |
| WO | 96/16910 A1 | 6/1996 |
| WO | 96/26160 A1 | 8/1996 |
| WO | 02/02866 A2 | 1/2002 |
| WO | 02/05934 A2 | 1/2002 |
| WO | 2005/090782 A2 | 9/2005 |
| WO | 2007/141255 A1 | 12/2007 |
| WO | 2007/147404 A2 | 12/2007 |
| WO | 2009/034365 A1 | 3/2009 |
| WO | 2009/129963 A2 | 10/2009 |
| WO | 2010/017652 A1 | 2/2010 |
| WO | 2010/114468 A1 | 10/2010 |
| WO | 2010/132047 A1 | 11/2010 |
| WO | 2011/080456 A1 | 7/2011 |
| WO | 2011/095599 A1 | 8/2011 |
| WO | 2013/028330 A2 | 2/2013 |
| WO | 2013/088179 A1 | 6/2013 |
| WO | 2015/017673 A1 | 2/2015 |
| WO | 2015/059714 A1 | 4/2015 |
| WO | 2015/183186 A1 | 12/2015 |
| WO | 2015/183190 A1 | 12/2015 |
| WO | 2016/042302 A1 | 3/2016 |
| WO | 2017/032560 A1 | 3/2017 |

(56) References Cited

FOREIGN PATENT DOCUMENTS

| WO | 2017/037461 A1 | 3/2017 |
| WO | 2017/214323 A1 | 12/2017 |
| WO | 2018/005710 A1 | 1/2018 |

OTHER PUBLICATIONS

Chinese communication dated May 18, 2023 in corresponding Chinese patent application No. 201980053675.3.
Du et al., Agricultural Machinery Hydraulic and Pneumatic Technology, Higher Education Press, p. 88, Apr. 2002.
Chinese communication, with English translation, dated Feb. 8, 2022 in corresponding Chinese patent application No. 201980053675.3.
Japanese communication, with English translation, dated May 10, 2022 in corresponding Japanese patent application No. 2021-507777.
European communication dated Apr. 20, 2022 in corresponding European patent application No. 19850221.3.
International Search Report and Written Opinion mailed Dec. 10, 2019 in corresponding PCT application No. PCT/US2019/046159.
International Preliminary Report on Patentability issued Feb. 16, 2021 in corresponding PCT application No. PCT/US2019/046159.
"Maxicaps MR: Unique Large Scale Single-Use Filter Device", Product Datasheet, Sartorius Stedim Biotech GmbH, 2021.
"Sartoclear Depth Filter: Cell Clarification and Containment Removal Technologies", Product Datasheet, Sartorius Stedim Biotech GmbH, 2020.
Indian communication dated Sep. 6, 2022 in corresponding Indian patent application No. 202117006626.

* cited by examiner

CLOSED BIOPROCESSING DEVICE

This application claims priority of U.S. Provisional Application Ser. No. 62/719,014, filed Aug. 16, 2018 and U.S. Provisional Application Ser. No. 62/837,236 filed Apr. 23, 2019, the disclosures of which are incorporated herein by reference in their entireties.

BACKGROUND

Bioprocessing operations where manufactured materials are exposed to the environment of the room must be controlled and sterilized at all times to avoid contamination of the product. Such bioprocessing operations; must therefore be executed in controlled, classified spaces (i.e. "clean rooms") to minimize the risk of contamination of the product feed stream. Classified spaces are very expensive to construct, operate, and maintain. Despite the precautions undertaken to avoid contamination, contamination events can still occur. Contamination can result in shut downs, cleaning and revalidation, each of which is expensive and time consuming. Accordingly, bioprocessing equipment and materials need to be sterilized prior to use in order to minimize contamination risk.

In view of the expense and time commitment needed to construct, operate and maintain controlled environments, there is a desire of biopharmaceutical manufacturers to move bioprocessing operations into controlled, non-classified spaces (i.e., "gray spaces") to allow for manufacturing flexibility as well as potential cost savings. While existing bioprocessing filters, especially depth filtration, tangential flow filtration, and virus filtration devices, may be sterilized prior to use, use of these devices in gray spaces would cause their sterility to be immediately breached upon removal from their bag or other packaging container due to the one or more open fluid ports present on the devices. These fluid ports are necessary to allow for modularity, i.e., the ability to vary the total filtration area, media grades, or other features depending on batch size, product attributes, etc., and thus their elimination is not a viable option.

Therefore, there exists a need for fully enclosed, sterile filtration devices that can maintain their internal sterility prior to assembly and during bioprocessing operations. It is likely that these closed filtration devices would also require aseptic connections to other bioprocessing operations. Herein, "aseptic" is defined as free from contamination caused by harmful bacteria, viruses, or other microorganisms, such as a level of asepsis below about 1 CFU/ml.

Conventional filters are sold as individual modules, where the end user loads them into a holder which compresses the assembly to engage seals and constrain the system, enabling operation under pressure (e.g., 60 psi working internal pressure). However, it is not possible with such systems to maintain sterility due to the module connection ports being open to ambient environment during loading into the holder, for example.

It is therefore an object of embodiments disclosed herein to provide appropriate and effective seals for the one or more fluid ports present in filtration cassettes or endcaps that allow for a plurality of modules to be interconnected to form a filtration assembly.

It is a further object of embodiments disclosed herein to provide a pre-sterilized module that comprises a plurality of filtration cassettes or endcaps having seals in their fluid ports to maintain sterility, such as during shipping.

It is yet a further object of embodiments disclosed herein to provide a plurality of pre-sterilized modules that can be assembled to form a filtration device suitable for filtration in a bioprocessing operation.

SUMMARY

Embodiments disclosed herein relate to a device that enables closed bioprocessing, such as so-called "downstream processing", e.g., processing (e.g., depth filtration) to remove or reduce contaminants from material that has been harvested in a bioreactor. In certain embodiments, the device enables aseptic fluid transfer. In some embodiments, the device is pre-sterilized and is a disposable device adapted for single-use. In certain embodiments, the device is a pre-assembled series of individual filtration packets, each of which contains filtration media and/or one or more membranes. In certain embodiments, the pre-assembled series of packets are under tension, such as with tie rods loaded to a particular force, e.g. 300 lbf each. The packets and endcaps may be interconnected to form modules, and one or more modules together with manifold endcaps may be held together to form a modular assembly and to engage inter-device seals and prevent unwanted ingress through one or more fluid ports. The complete assembled device may be sterilized, such as by gamma radiation, autoclaving, steaming, ozone or ethylene oxide treatment, to render the interior of the device sterile. Subsequent aseptic connections may be made to process tubing, thereby permitting aseptic fluid transfer such as filtration operations without contaminating either the filtration media or the process fluid.

In certain embodiments, one or more fluid ports of one or more filtration devices may be surrounded by two separate or independent seals. The fluid ports themselves may provide a liquid pathway to and from filtration media or to and from one or more membranes, or may provide a gaseous pathway such as for venting. In certain embodiments, a primary seal is disposed about a fluid port and functions as an inner seal that is capable of withstanding the high pressures (e.g., 30-60 psi) generated during bioprocessing operations. In certain embodiments, a secondary seal also surrounds the fluid port and functions as an outer seal that is a low pressure/high compliance seal. In certain embodiments, the secondary seal is concentric to the primary seal, spaced therefrom, and has a larger diameter than the primary seal. In some embodiments, the secondary seal maintains the sterility of the device interiors during shipping and/or handling of the device.

These features enable bioprocessing steps to be conducted in a sterile manner in controlled, non-classified spaces. As a result, the equipment may be designed and operated such that the product is not exposed to the room environment.

Accordingly, in some embodiments a filtration module is provided, the module comprising at least one filtration packet containing filtration media or one or more membranes, such as a stack of membranes, the at least one filtration packet having one or more fluid ports, the one or more fluid ports being surrounded by a primary seal and a secondary seal spaced from the primary seal. One fluid port may be an inlet port. One fluid port may be an outlet port. One fluid port may be a vent port.

More specifically, in some embodiments a plurality of filtration modules is provided, each comprising one or more filtration packets containing filtration media or one or more membranes, wherein a first of the plurality of filtration modules comprises a first fluid port surrounded by a first primary seal and a first secondary seal spaced from the first primary seal. A second of the plurality of filtration modules comprises a second fluid port surrounded by a second primary seal and a second secondary seal spaced from the second primary seal. When the first and second filtration modules are engaged under pressure such that the first fluid port aligns with the second fluid port, the first secondary seal contacts the second secondary seal and prevents contaminant ingress into the first and second fluid ports.

In some embodiments, at least one fluid port is configured to direct fluid flow through one or more filtration packets in a first direction, and endcaps sandwiching a plurality of filtration packets in a module include at least one fluid channel that redirects the fluid flow in a second direction different from said first direction. In some embodiments, the second direction is orthogonal to said first direction.

In some embodiments, a film covers one or more of the fluid ports, and may be removed when the modules are partially engaged and/or partially compressed.

In certain embodiments, a pre-assembled, sterilized modular device is provided, comprising a plurality of filtration modules, each filtration module comprising one or more filtration packets. One or more modules can be interconnected, and can be stored and/or transported in a rack.

In some embodiments, a spacer plate devoid of filtration media (i.e., devoid of media and a membrane), may be positioned between two filtration modules. The spacer plates may have one or more fluid ports, each configured and positioned to align with a respective one of the fluid ports in an endcap when in the assembled condition. In certain embodiments, each of the fluid ports of the spacer plate has primary and secondary seals. In certain embodiments, the spacer plate may have one or more co-radial annular seals that extend radially outwardly from opposing front and back surfaces of the spacer plate. Each co-radial seal may include a radially protruding member having an annular seal such as a gasket.

Additional features and advantages of the embodiments disclosed herein will be set forth in the detailed description and claims, which follow. Many modifications and variations can be made without departing from its spirit and scope, as will, be apparent to those skilled in the art. It is to be understood that the foregoing general description and the following detailed description, the claims, as well as the appended drawings are exemplary and explanatory only, and are intended to provide an explanation of various embodiments of the present teachings.

BRIEF DESCRIPTION OF THE DRAWINGS

FIG. 1C is a cross-sectional view of the dual-purpose seal of FIG. 14A;

DETAILED DESCRIPTION

Figure 1A:
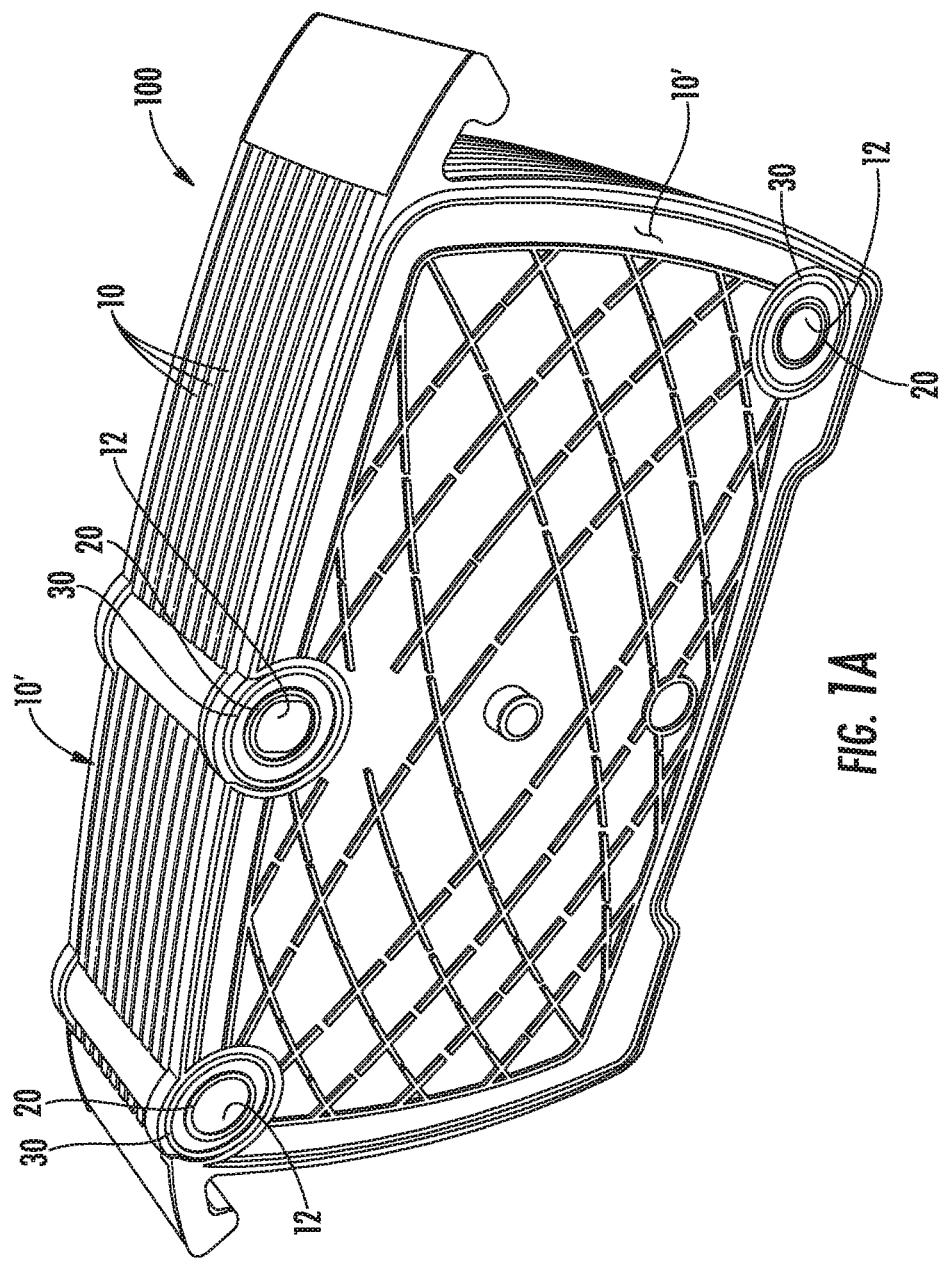
FIG. 1A is a perspective view of a filtration module having inner and outer fluid port seals in accordance with certain embodiments.

A more complete understanding of the components, processes and devices disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

Figure 1B:
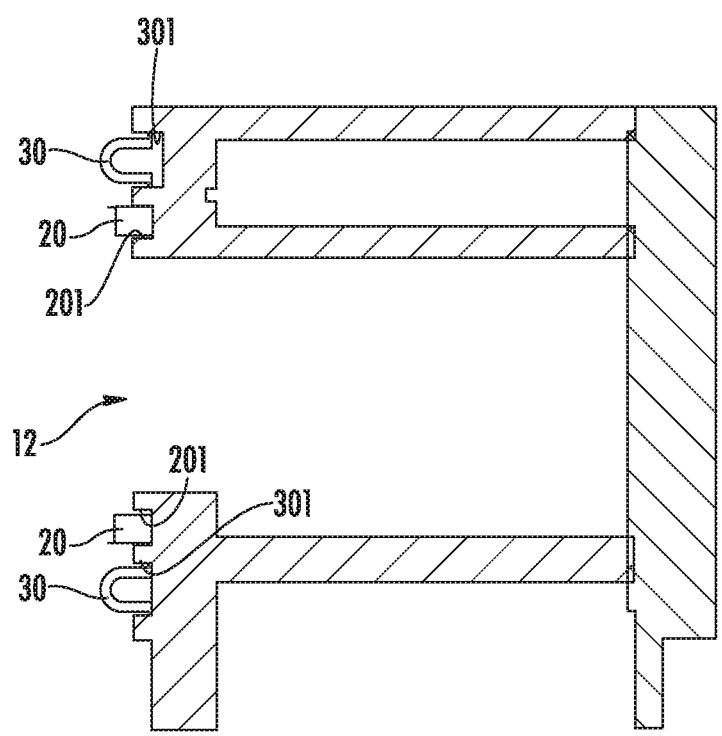
FIG. 1B is a cross-sectional view of a fluid port having inner and outer fluid port seals in accordance with certain embodiments.

Turning now to FIGS. 1A and 1B, there is shown a filter module 100 in accordance with certain embodiments. The filter module 100 may be an assembly of a plurality of rigid filter packets 10, each of which includes one or more fluid ports 12 that provides fluid communication to one or more fluid channels formed in each packet 10. In the embodiment shown, there are ten such packets 10, but fewer or more could be used to form a module 100. The filter module 100 also includes two opposite rigid endcaps 10' that together sandwich the packets 10 between them. The packets 10 and module 100 may be disposable single-use devices, and may be made of a suitable material that is sterilizable, such plastic, polycarbonate or a polyolefin such as polypropylene.

In certain embodiments, a plurality of individual packets 10 may be arranged in series and form a module 100, and may be interconnected to provide fluid communication between them through their respective fluid ports 12. A modular device can be assembled, with a plurality of packets 10 as well as a plurality of modules 100 that can be interconnected to form a filtration device. The device may be stored and/or transported in a rack or the like. In certain embodiments, one of the fluid ports 12 may be an inlet port for the introduction of a liquid sample into the assembly, one or more may be an outlet port for removal of a liquid sample from the assembly, and one or more may be a vent port for venting gas such as air from the assembly.

Figure 7A:
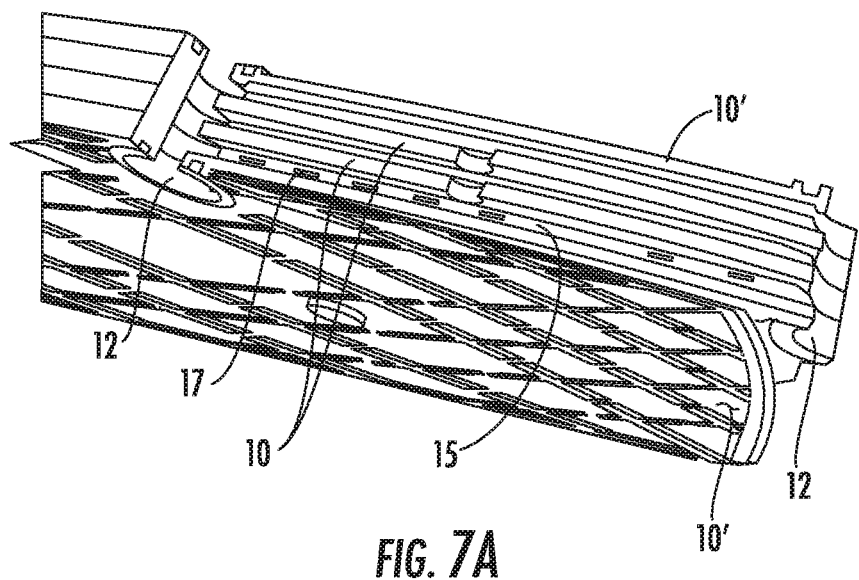
FIG. 7A is a perspective view of a filtration module showing the flow path of fluid in accordance with certain embodiments.
Figure 7B:
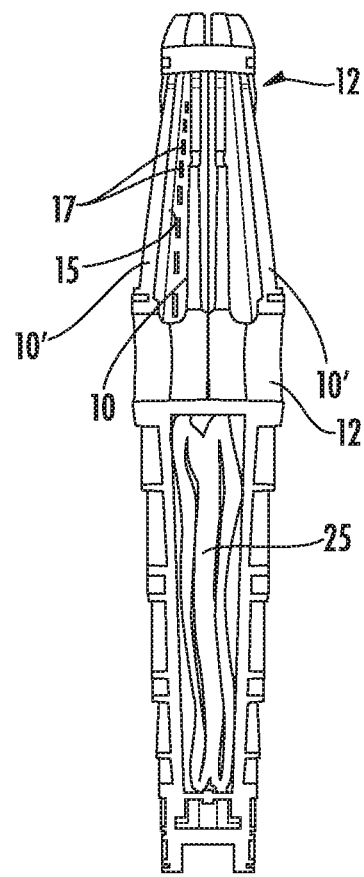
FIG. 7B is another perspective view of a filtration module showing the flow path of fluid in accordance with certain embodiments.

One or more of the filter packets 10 may contain media, such as media suitable for depth filtration, tangential flow filtration, cross-flow filtration, etc. Exemplary depth filtration media includes diatomaceous earth, cellulose, activated carbon, polyacrylic fiber and silica, such as those sold under the Clarisolve® and Millistak+® names by MilliporeSigma. One or more of the filter packets 10 may include one or more membranes, such as a stack of membranes. One typical fluid flow path through a filter module 100, as is known by those skilled in the art, is shown in FIGS. 7A and 7B. In the embodiment shown, fluid enters an inlet fluid port 12, and flows into a channel 15 formed across the packet body and then downward through small slits 17 formed in the channel 15 to the upstream side of the media or membrane(s) 25. The fluid then flows through the media or membrane(s) 25, and enters similar slits positioned in a channel at the downstream side of the media or membrane(s) 25, and the flows out the outlet fluid port 12 as seen in FIG. 7B.

In certain embodiment, one or more of the fluid ports 12 of a module 100 is surrounded or encompassed by two seals. Preferably each of the fluid ports 12 is surrounded two seals, and preferably the seals surround the inlet (or outlet) opening of the fluid port 12, and are thus positioned on an endcap 10'. In certain embodiments, there is an inner primary seal 20 and an outer secondary seal 30. In some embodiments, the primary seal 20 is closer to the inlet (or outlet) opening of the fluid port 12, i.e., it is disposed radially inwardly of the secondary seal 30 with respect to the axial bore of the fluid port 12 (the bore that extends between the opposite endcaps 10'). In some embodiments, each of the primary seal 20 and secondary seal 30 is a gasket. The primary seal 20 should be capable of withstanding the high pressures (e.g., 30-60 psi) generated during bioprocessing operations (e.g., filtration). In certain embodiments, a secondary seal 30 is an outer seal that is a low pressure/high compliance seal. This secondary seal 30 need not be capable of withstanding the high pressures generated during bioprocessing operations; its main objective is to mitigate or prevent contamination of the fluid port 12 during shipping and/or handling of the device. In certain embodiments, the secondary seal is concentric to the primary seal, spaced therefrom, has a larger diameter than the primary seal 20, and extends outwardly from the endcap 10' a distance greater than the primary seal 20 (see FIG. 1B). In some embodiments, the secondary seal maintains the sterility of the device interiors during shipping and/or handling of the device. A suitable primary seal may be made of a thermoplastic vulcanizate (TPV) and may have a hardness value (Shore A) in the range of about 35-45, more preferably about 38-42, most preferably about 42. A suitable secondary seal may have a hardness value less than that of the primary seal, such as in the range of about 25-35 (Shore A), preferably about 28-32. In certain embodiments, each seal is secured in a corresponding groove 201, 301 (FIG. 1B) formed in the endcap 10' by a friction fit, and/or with an adhesive.

Figure 2A:
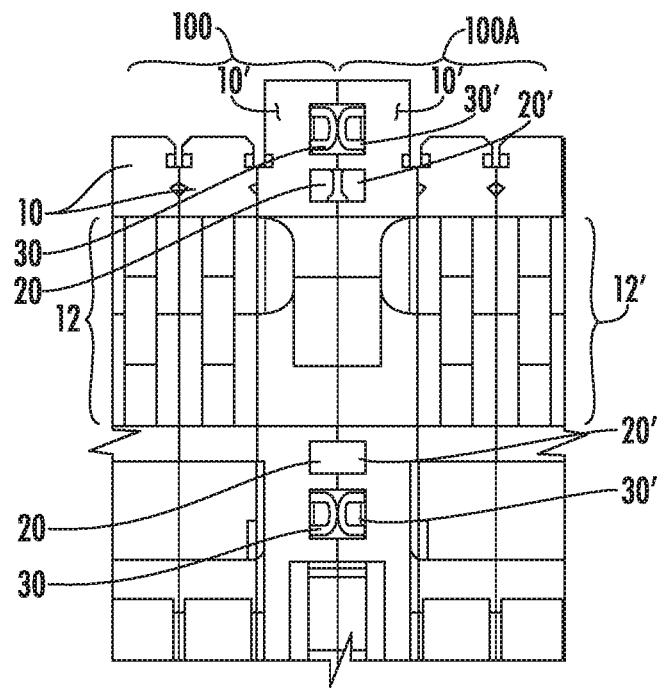
FIG. 2A is a cross-sectional view of two aligned filtration modules in accordance with certain embodiments.
Figure 2B:
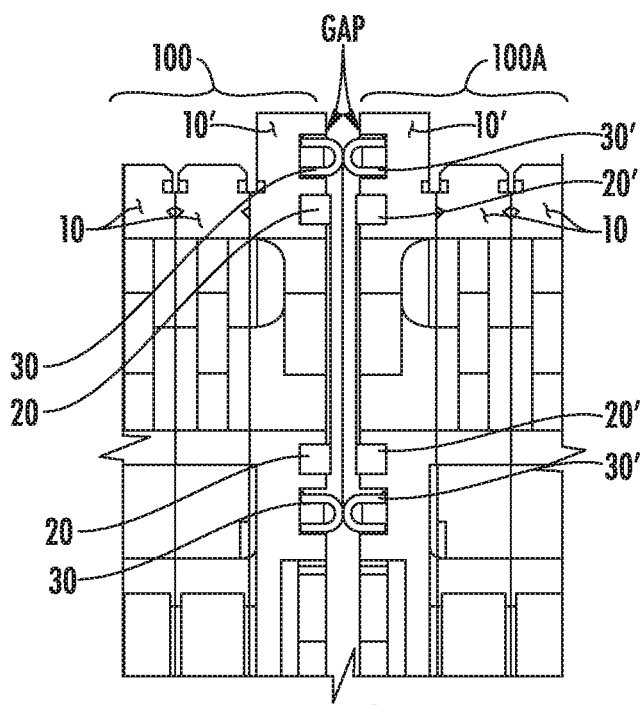
FIG. 2B is a cross-sectional view of two aligned filtration modules with an acceptable gap between them, in accordance with certain embodiments.

When multiple modules 100-100N are placed in series, as partially illustrated in FIGS. 2A and 2B, the one or more fluid ports 12 from a first endcap 10' of a first module 100 is aligned with a corresponding second fluid port 12' of a second endcap 10' of a second module 100A. The second fluid port 12' of the second module 100A also includes an inner primary seal 20' and an outer secondary seal 30'. When aligning the first module 100 with the second module 100A, outer secondary seal 30 from the first module 100 aligns with and contacts the outer secondary seal 30' from the second module 100A, as shown in cross-section in FIG. 2A. As a result, the outer secondary seals 30 and 30' together form a barrier to entry to the fluid port 12, even under pressure significantly less than operating pressures. As seen in FIG. 2B, the size, position and configuration of the outer secondary seals 30 and 30' are sufficient to create this barrier to entry even if a small gap between the first module 100 and second module 100A is present, whereas the primary inner seals 20, 20' need not contact each other during shipping and/or handling. That is, since the outer secondary seals 30 and 30' extend outwardly from their respective endcaps 10' a greater distance than do the respective primary seals 20 and 20', they contact one another before the primary seals 20 and 20' contact one another as the modules are aligned.

Figure 3:
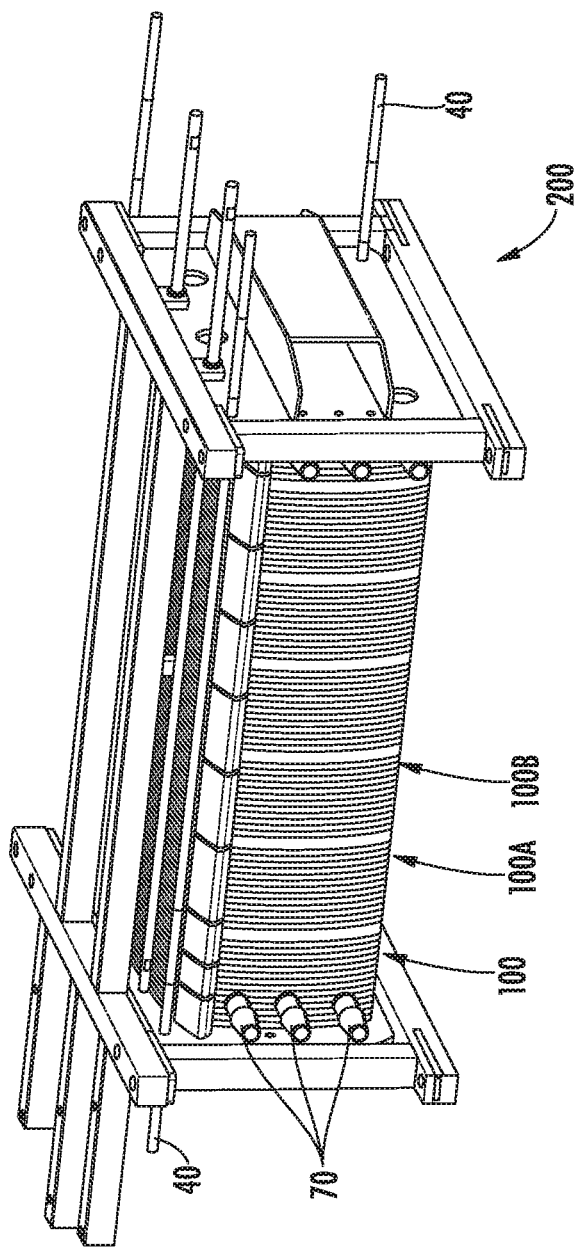
FIG. 3 is a perspective view of a filtration assembly loaded into a holder in accordance with certain embodiments.
Figure 4:
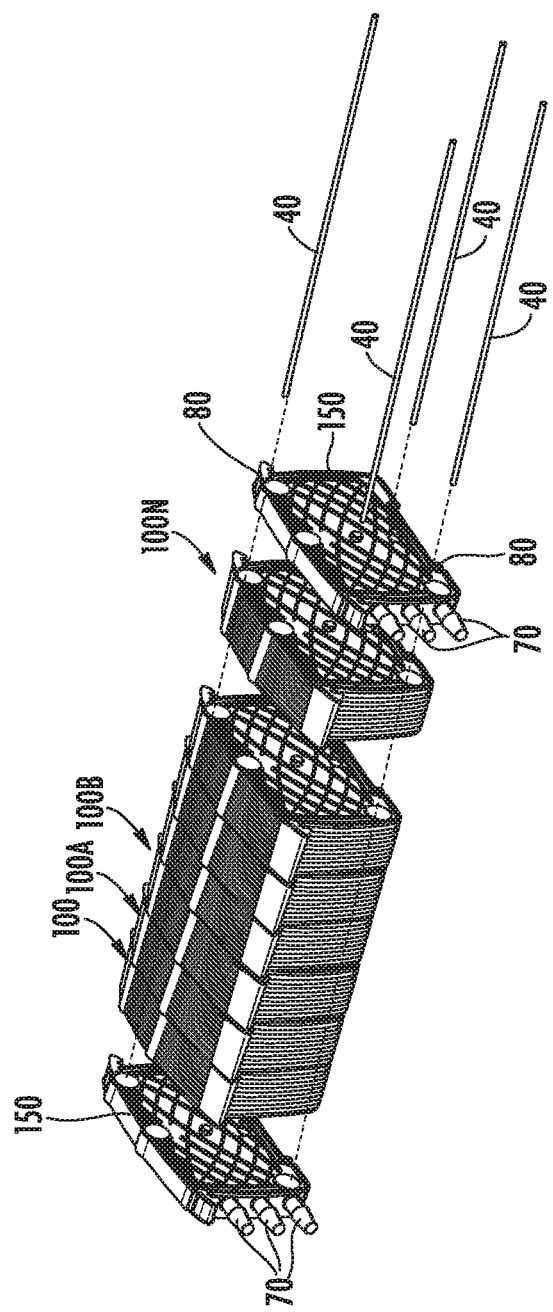
FIG. 4 is an exploded view of a plurality of modules and manifold endcaps in a partially assembled condition in accordance with certain embodiments.

As shown in FIGS. 3 and 4, in certain embodiments individual modules 100, 100A, 100B, etc. may be assembled and interconnected along with a manifold endcap 150 at each end to create a continuous, sealed fluid flow path. This closed, continuous fluid flow path may be sterilized, such as prior to shipment to the end user. The outer seals 30 and 30' function to maintain the sterility. The end user may then load the pre-assembled, pre-sterilized assembly into a suitable holder 200, and aseptically connect it to a mating flow path such as with sterile-to-sterile connectors, aseptic tube welders, etc.

Figure 5:
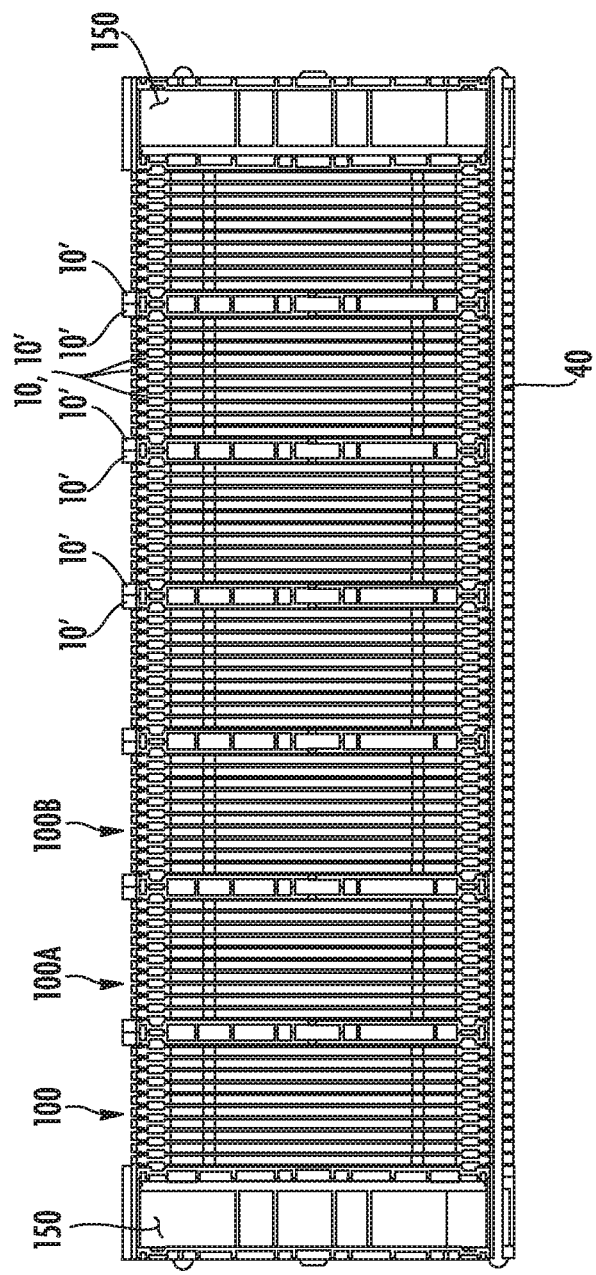
FIG. 5 is a cross-sectional view of a plurality of modules and manifold endcaps in an assembled condition in accordance with certain embodiments.

In certain embodiments, as best seen in FIGS. 4 and 5, tie rods 40 or the like may be used to attached, restrain and tension the assembly of individual filter modules 100, 100A, 100B, etc. The tie rods may be made of any suitable material to carry out these functions, such as a thermoplastic resin, and may be threaded. In some embodiments, the tie rods 40 are positioned through suitable apertures in the plurality of filter modules 100 and are secured by bolts, fasteners or the like to compress the modules 100 and cause opposing outer secondary seals 30, 30' to contact each other and provide the necessary aseptic barrier for their respective filter ports 12. The tie rods 40 can be preloaded with a predetermined tension/pressure, such as with a hydraulic pump, to maintain compression and thus the integrity of the modules during shipping, handling, storage and/or installation. Preferably a sufficient tensile force is generated to ensure that each of the secondary seals 30 remain engaged and intact throughout the shipping and handling process. Suitable force is about 300 lbf, for example. Bands or clips could be used in place of tie rods 40 to accomplish the same function.

Figure 6:
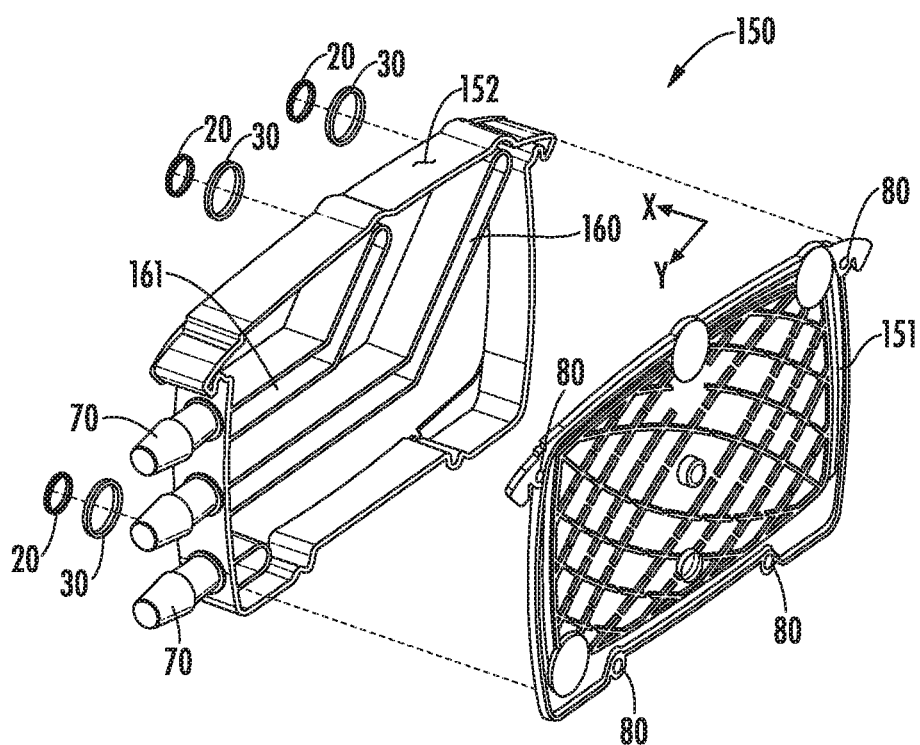
FIG. 6 is an exploded view of a manifold endcap in accordance with certain embodiments.

In certain embodiments, as shown in FIG. 6, one or more of the manifold endcaps 150 may be configured to divert or redirect the fluid flow path to a common direction, such as from the normal direction (parallel to the assembly of devices in series) to the orthogonal direction (perpendicular to the assembly of devices in series). This allows for the entire assembly (including tubing, fittings, connectors, etc.) to fit on a standard pallet for shipping and sterilization, and facilitate connection to ancillary equipment. In certain embodiments, one or more of the endcaps 150 can be constructed form two molded parts and welded together, e.g., plate 151 and body 152. Internal to body 152 are channels 160 and 161, each of which is angled to redirect the flow from the X-direction to the Y-direction as shown. The flow paths may terminate in hose barb fittings 70 as shown, or in other appropriate fittings or the like, such as tri-clover (TC) or sanitary fittings. Preferably the flow path fittings provide a way to make aseptic connections between the filtration device and process tubing or the like without the risk of contaminating either the filtration media or the process fluid, and can include fittings such as LYNX® S2S and CDR connectors commercially available from MilliporeSigma. Additionally, the filter inlet, vent, and outlet ports, shown in FIGS. 3, 4, 6, 17 may be standard hose barbs 70, sanitary flange connectors (TC connectors), or any of the commercial sterile-to-sterile connectors known in the art, such as AseptiQuik® G (Colder Products Corp), ReadyMate disposable aseptic connectors (GE Healthcare), or Kleenpak® Presto sterile connectors (Pall Corp.).

In certain embodiments, the pre-assembled, sterilized module assembly can be loaded into a holder 200 (FIG. 3), such as a stainless-steel holder, and hydraulic pressure can be applied to bring the assembly to the appropriate operational/working pressure necessary for the bioprocessing operation. Such pressure provides sufficient compression between the inner, primary gasket seals 20, thereby enabling a fluid-tight connection between each of the filter device modules in the assembly.

Figure 8:
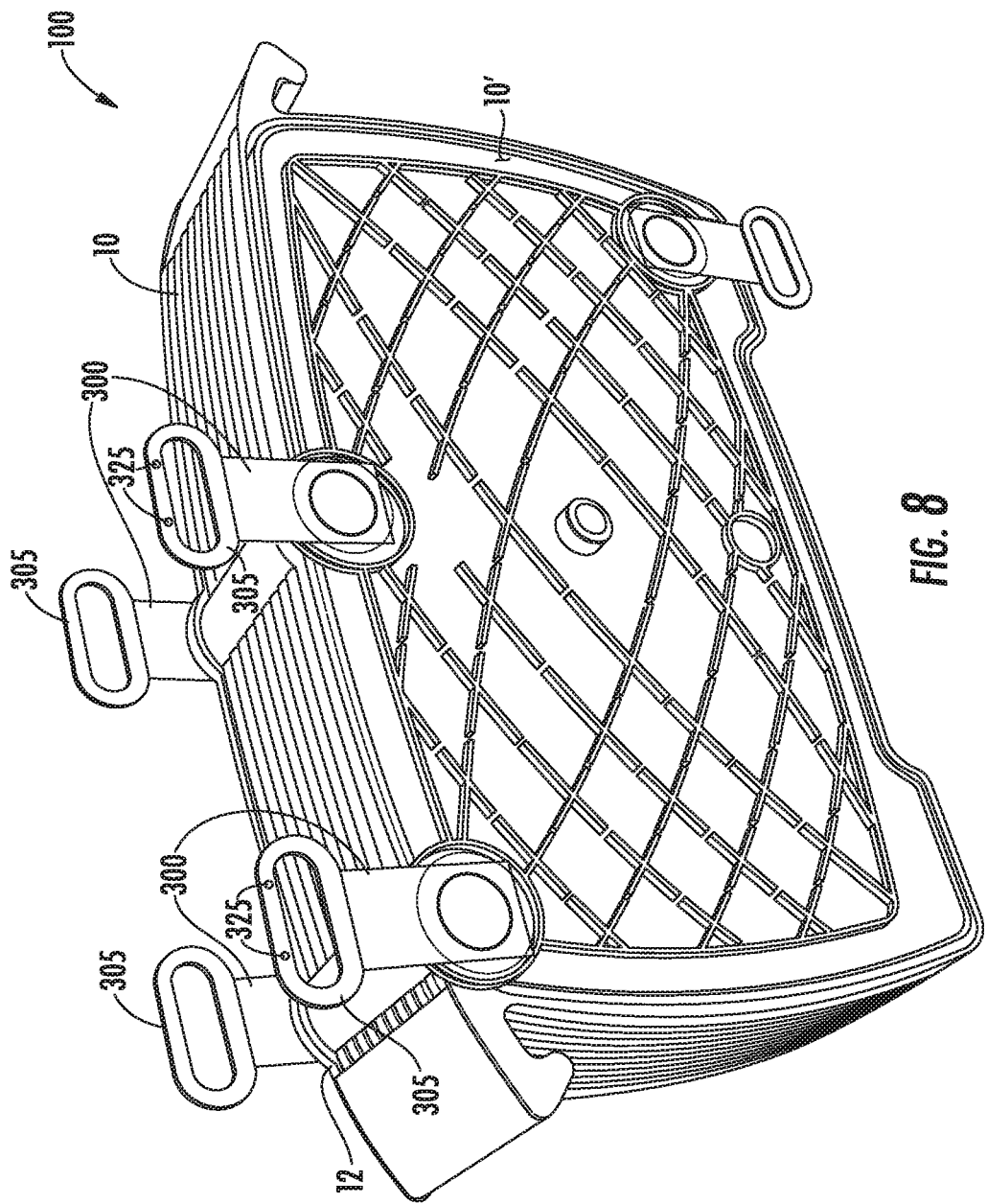
FIG. 8 is a perspective view or a filtration module having films providing temporary and removable seals for fluid ports in accordance with certain embodiments.

Turning now to FIG. 8, there is shown an embodiment where a film 300 is used to protect one or more fluid ports 12 in a filter module. The film may be composed of either vapor permeable or vapor impermeable material. One suitable material is a flashspun high-density polyethylene fibers, sold under the name TYVEK® by DuPont. The film 300 may be affixed or sealed to the device housing (e.g., the endcaps 10') using an adhesive, heat bonding or other suitable technique. The film 300 should be dimensioned to completely cover the fluid port 12 with which it is associated (in FIG. 8, the seals 20, 30 can be seen through the film 300; this is depicted this way for clarity to show the location of the seals 20 and 30, it should be understood that the film 300 is intended to cover the fluid port 12 and the seals 20 and 30 (if present)).

Figure 9A:
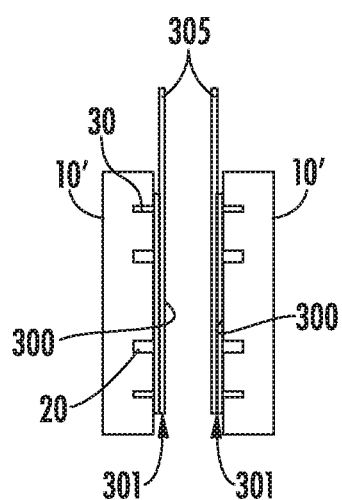
FIGS. 9A, 9B and 9C are schematic diagrams showing removal of the temporary seals shown in FIG. 8, in accordance with certain embodiments.
Figure 9B:
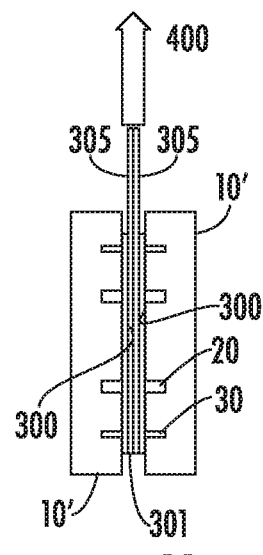
Figure 9C:
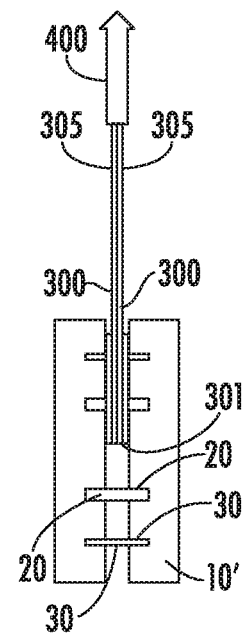

In certain embodiments, the films 300 are folded on themselves to reduce or minimize the pull force necessary to remove them, and to minimize the chance of microbial ingress into a fluid port 12 by ensuring that the potentially contaminated faces of the films are never exposed to the device interiors. FIGS. 9A, 9B and 9C shows one embodiment of a suitable folded film. Thus, as seen in FIG. 9A, the film 300 attaches to the endcap body over the fluid port. In the embodiment shown, both the primary and secondary seals 20, 30 are present, although it will be appreciated by those skilled in the art that the secondary seal 30 need not be used. The film is folded at the bottom region of attachment at 301, and then extends over itself, thus forming a second film layer over the fluid port 12. This helps ensure sterility, and also reduces the pull force necessary to remove the films. Preferably the outer overlapping layer extends above the packet body as shown, and can include a handle 305 to facilitate manual grasping and pulling of the film to remove the film from the packet at the appropriate time, and to provide more ergonomic handling of the modules. FIG. 9B depicts the films 300 on two modules that have been brought together to allow for fluid communication between their respective fluid ports 12. The handles 305 are pulled in the direction of arrow 400 to remove the films. As shown in FIG. 9C, the folded films from each module slide together as they are pulled simultaneously. Once the primary seals 20 are exposed, they expand radially to their normal (uncompressed by the seal) dimension and engage each other, maintaining integrity of the seal. The removal of the films 300 serves to open the flow path between the filter modules in an aseptic manner. The handles 305 may have clips and/or alignment pegs or the like to assist with alignment and connection.

In certain embodiments, the individual filter modules 100 with films 300 in place would be loaded into a holder, such as the stainless-steel holder 200 shown in FIG. 3, such that the fluid ports 12 on each device are respectively aligned. The hydraulic pressure of the holder 200 can be increased to an intermediate state (e.g., 100-500 psi) to engage the device primary seals 20 and create an integral seal while still allowing for easy film 300 removal.

In certain embodiments, one or more spacer plates 350 (FIGS. 10A and 10B) may be positioned between two or more individual endcaps 10' of adjacent modules 100 in a filtration unit. In certain embodiments, each spacer plate 350 is devoid of a filtration element (i.e., devoid of media and devoid of a membrane). The spacer plates 350 may have one or more fluid ports 12', and preferably have the same number of fluid ports 12' that the endcaps 10' have. Each of the fluid ports 12' is configured and positioned to align with a respective one of the fluid ports 12 in an endcap 10' when in the assembled condition. In certain embodiments, each of the fluid ports 12' of the spacer plate 350 has a secondary, concentric large diameter gasket 30', preferably made of a high compliance elastomeric material, positioned about each fluid port 12' and extending radially outwardly from the opposing front and back surfaces of the spacer plate 350 as best seen in FIG. 10B. These gaskets may be made of the same material as the gaskets 30, and may be forced fit into grooves and/or secured with an adhesive. The spacer plates 350 thus incorporate the required secondary seals into a separate fixture.

Figure 11A:
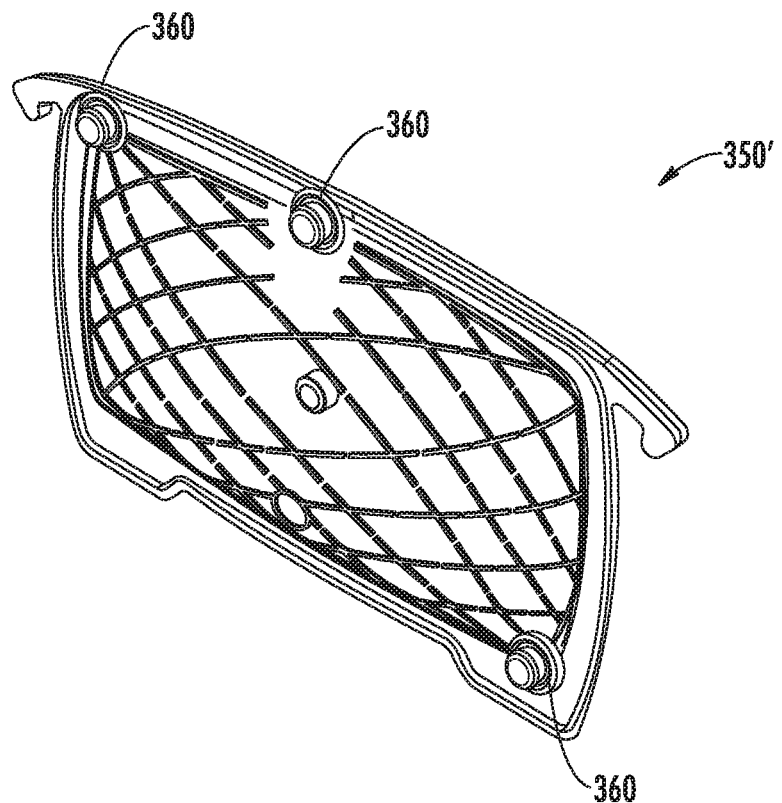
FIG. 11A is a perspective view of an alternative embodiment of a spacer plate in accordance with certain embodiments.
Figure 11B:
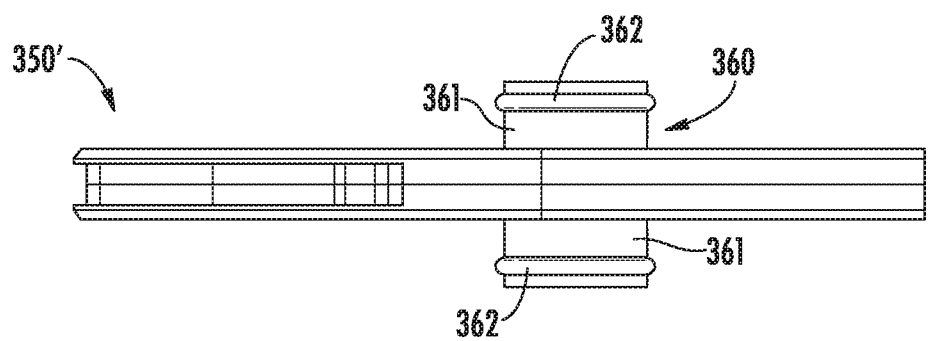
FIG. 11B is a top view of a portion of the spacer plate of FIG. 11A.
Figure 11C:
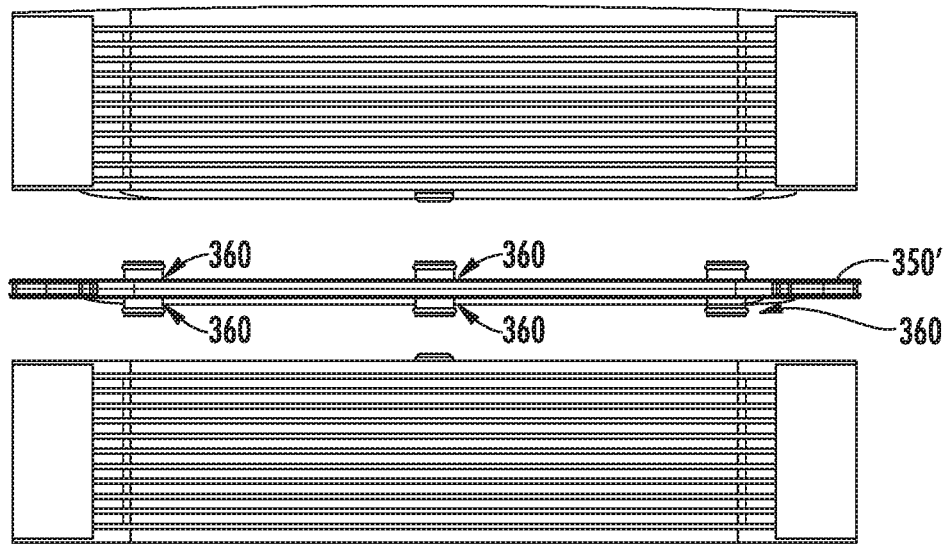
FIG. 11C is a top view of the spacer plate of FIG. 11A shown between two filtration modules in accordance with certain embodiments.
Figure 11D:
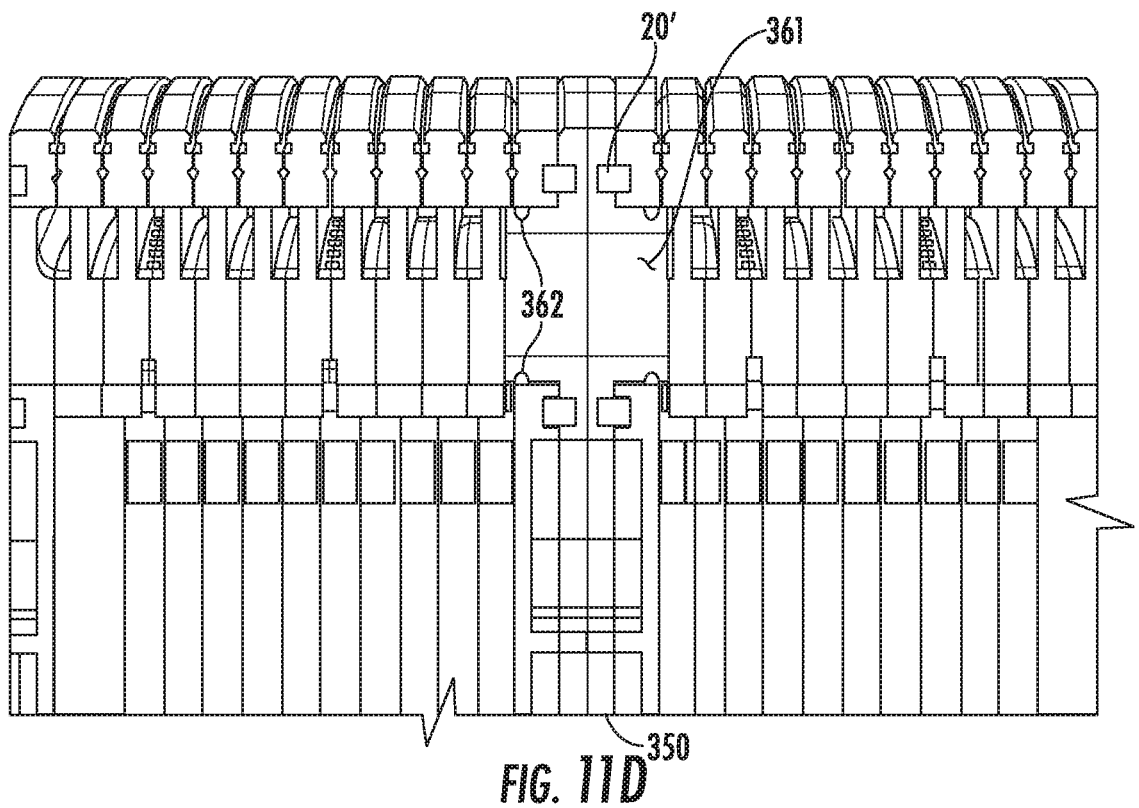
FIG. 11 is a cross-sectional view of the spacer plate of FIG. 11A positioned in a device in accordance with certain embodiments.

FIGS. 11A, 11B, 11C and 11D illustrate a modified spacer plate 350'. Like the spacer plates 350, each spacer plate 350' is devoid of a filtration element (i.e., devoid of media and devoid of a membrane). In this embodiment, the spacer plate 350' has one or more co-radial annular seals 360 that extend radially outwardly from opposing front and back surfaces of the spacer plate 350', as best seen in FIG. 11B. Each co-radial seal includes a radially protruding member 361 having an annular gasket 362. Preferably the spacer plate 350' has the same number of co-radial annular seals 360 as the number of fluid ports 12 that the endcaps 10' have. Each of the co-radial annular seals 360 may be configured and positioned to align with a respective one of the fluid ports 12 in an endcap 10' when in the assembled condition. The spacer plates 350' may be configured to be inserted into device inlet, outlet and vent ports, whereby the co-radial annular seals provide the airtight/closed/sterile environmental seals necessary for shipping, handling and setup. In the embodiment of FIG. 11D, the spacer plate 350' also includes primary seals 20', which may be made of the same material as the gaskets 361.

Figure 12A:
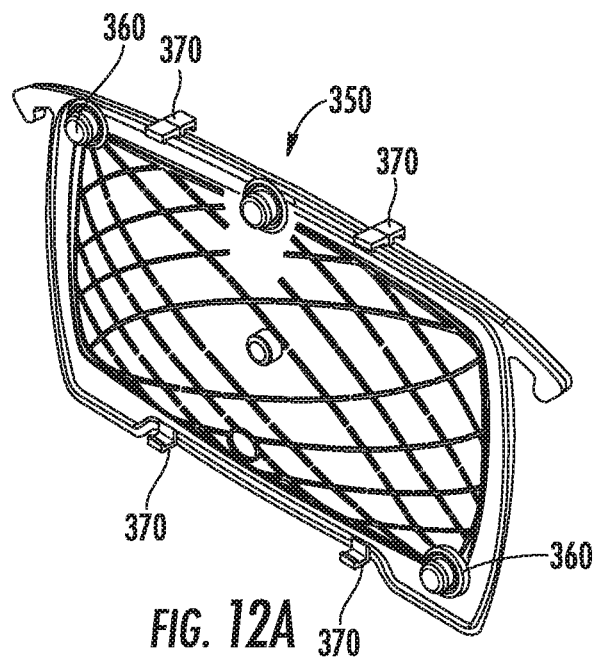
FIG. 12A is a perspective view of a spacer plate with attachment clips in accordance with certain embodiments.
Figure 12B:
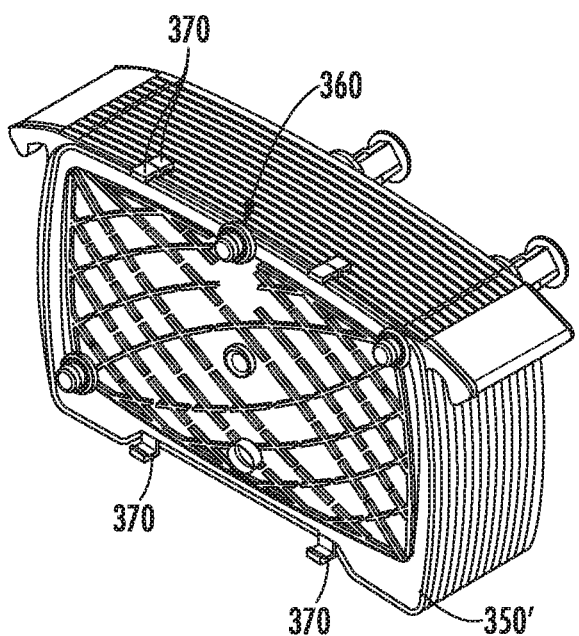
FIG. 12B is a perspective view of a module including the spacer plate of FIG. 12A.
Figure 12C:
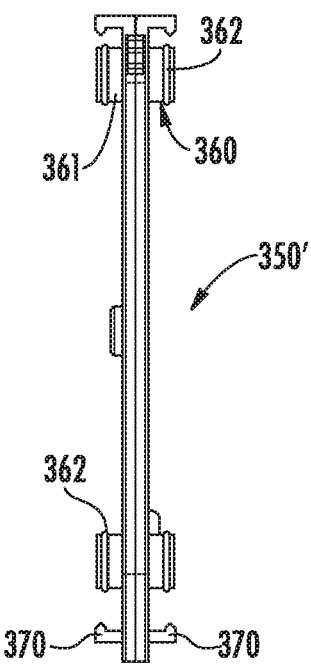
FIG. 12C is a cross-sectional view of the spacer plate of FIG. 12A.

In some embodiments, as shown in FIGS. 12A, 12B and 12C, the spacer plates 350' (or 350) may include one or more clips 370 or the like to facilitate connection to adjacent devices (as opposed to or in addition to using tie rods, etc.). In the embodiment shown, there are four clips in total: two on the top surface and two on bottom surface, although those skilled in the art will appreciate that fewer or more could be used. In the embodiment shown, the clips 370 are generally L-shaped and may engage existing grooves/channels present on a packet, or could fit into specially designed receiving slots/grooves/channels designed into modified devices.

Figure 13:
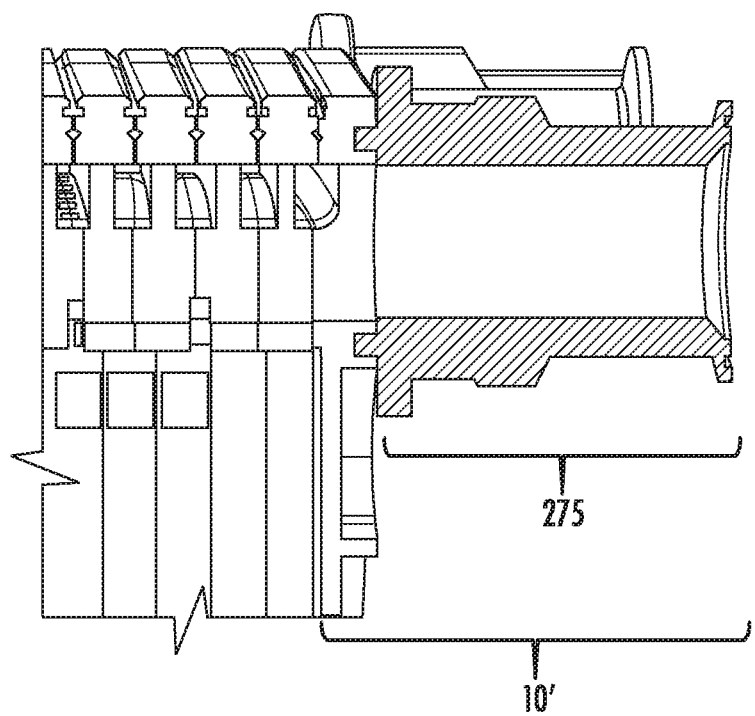
FIG. 13 is a cross-sectional view of a modified endcap with a T-type adapter in accordance with certain embodiments.

FIG. 13 illustrates an alternative embodiment of an endcap 10' that includes a TC-type (Tri-Clover) adapter 275 to which tubing may be connected. The tubing may be terminated in a suitable sterile connector, such as a Lynx S2S connector. By integrating/pre-attaching the adapter 275 directly to one or more of the fluid ports, preferably all of the fluid ports of the endcap, and attaching tubing pigtails or tubing terminated in suitable sterile connectors, the device is functionally closed while retaining the inter-device fluid paths as they are conventionally configured.

Figure 14A:
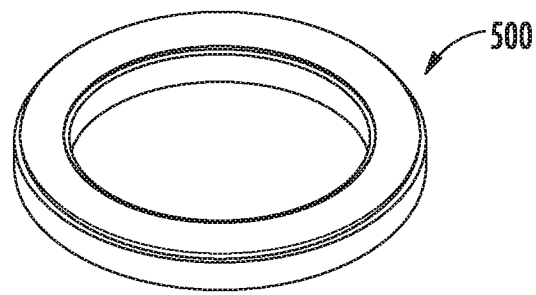
FIG. 14A is a perspective view of an integrated dual-purpose seal in accordance with certain embodiments.
Figure 14B:
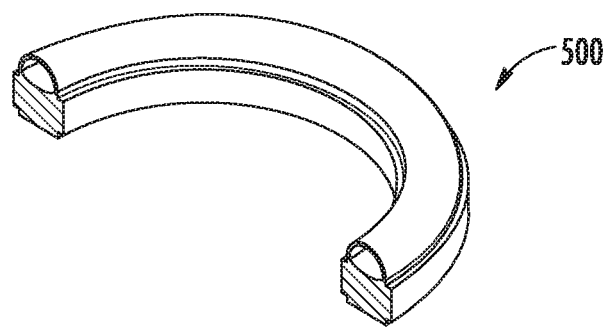
FIG. 14B is a perspective view of a portion of the dual-purpose seal of FIG. 14A, sliced so that the interior is visible.
Figure 14C:
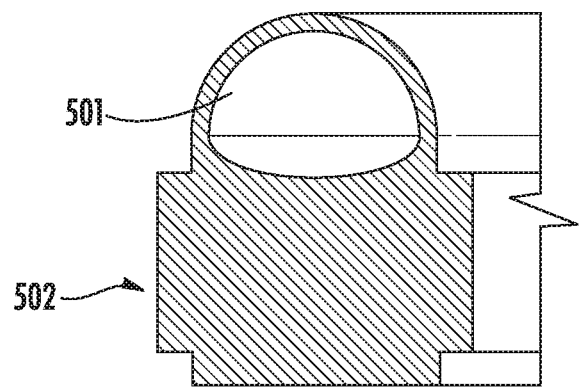

FIGS. 14A, 14B and 14C illustrate an alternative embodiment where the primary and secondary seals are integrated into a single seal 500. In certain embodiments, the integrated seal 500 is configured to occupy the same footprint as the primary seal 20, and incorporates a dual-function design that allows for the device to remain airtight, closed and/or sterile at low clamping forces (e.g., during shipping, handling and setup), and achieve liquid-tightness at high clamping forces (e.g., during higher-pressure operations). In accordance with certain embodiments, one portion of the seal 500 provides the high compliance necessary to maintain a closed system and sterility, and the other portion of the seal 500 provides the low compliance necessary to withstand high liquid pressure operations. In certain embodiments, the integrated seal 500 includes a hollow portion 501 that provides high compliance and maintains closedness/sterility, and a solid portion 502 that provides low compliance and withstands operating pressures. In certain embodiments, the integrated seal 500 extends radially outwardly from the surface of the fluid port a distance sufficient to contact an opposing integrated seal on an adjacent device so as to form an integral environmental/sterile seal. Other embodiments include a dual-function seal where the two seals are not integrated but rather sit radially one over the other. In certain embodiments, the integrated seal 500 is made of thermoplastic vulcanizate (TPV) and may have a hardness value (Shore A) in the range of about 35-45, more preferably 38-42, most preferably 42.

In certain embodiments, a pre-assembled depth filtration unit (containing, for example, 1, 2, 3, or 6 pods), each utilizing a single endplate manifold with integrated hose barbs, may be formed. One skilled in the art would recognize that the hose barbs could be terminated with suitable sterile-to-sterile connection fittings. The following Table contains exemplary calculations of total filter areas, calculated units per holder, and estimated batch volumes for each example:

TABLE 1

| Media Grade | X0SP* | D0SP** | D0SP** | D0SP** |
|---|---|---|---|---|
| Number of pods | 1 | 2 | 3 (half rack) | 6 (full rack) |
| Total filtration area (m2) | 1.1 | 1.54 | 2.31 | 4.62 |
| Approx. batch volume (L) | 165 | 231 | 346 | 693 |
| Units per 1-high process scale rack | 6 | 3 | 2 | 1 |

Figure 10A:
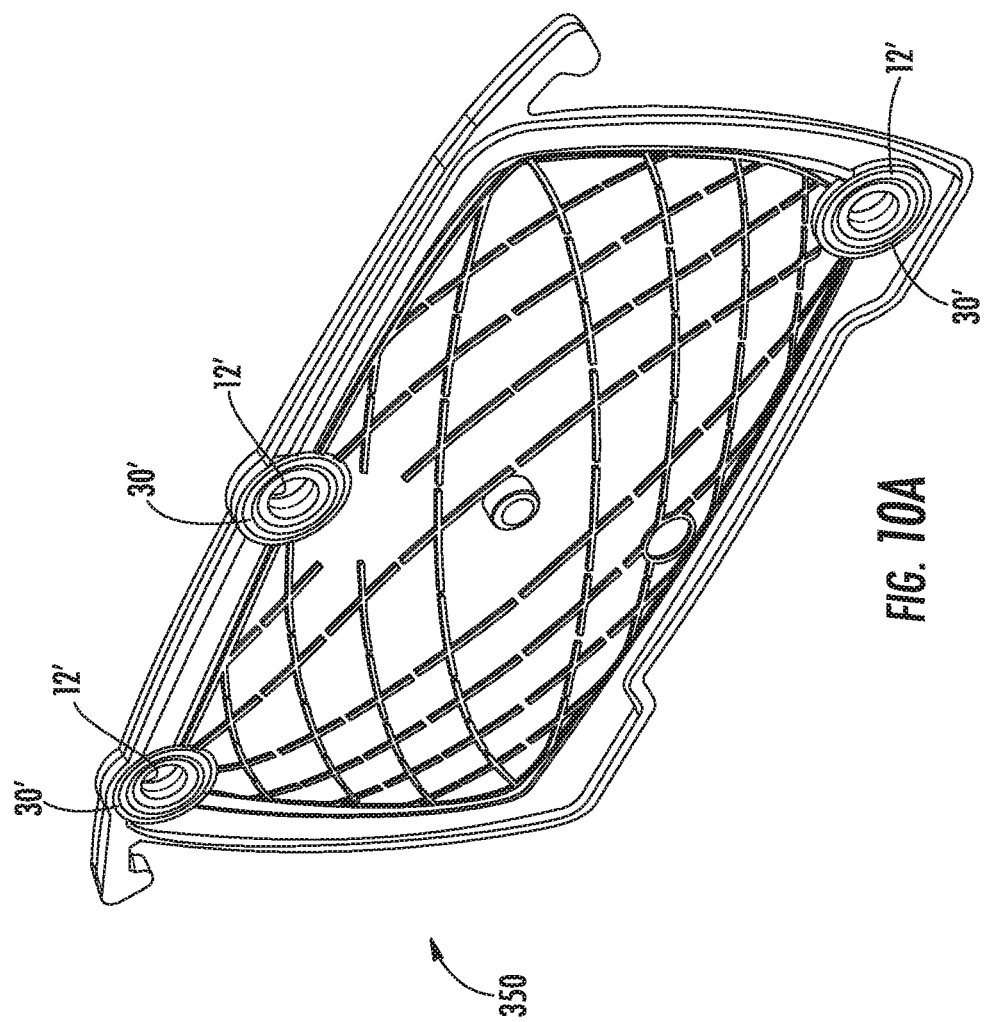
FIG. 10A is a perspective view or a spacer plate in accordance with certain embodiments.
Figure 10B:
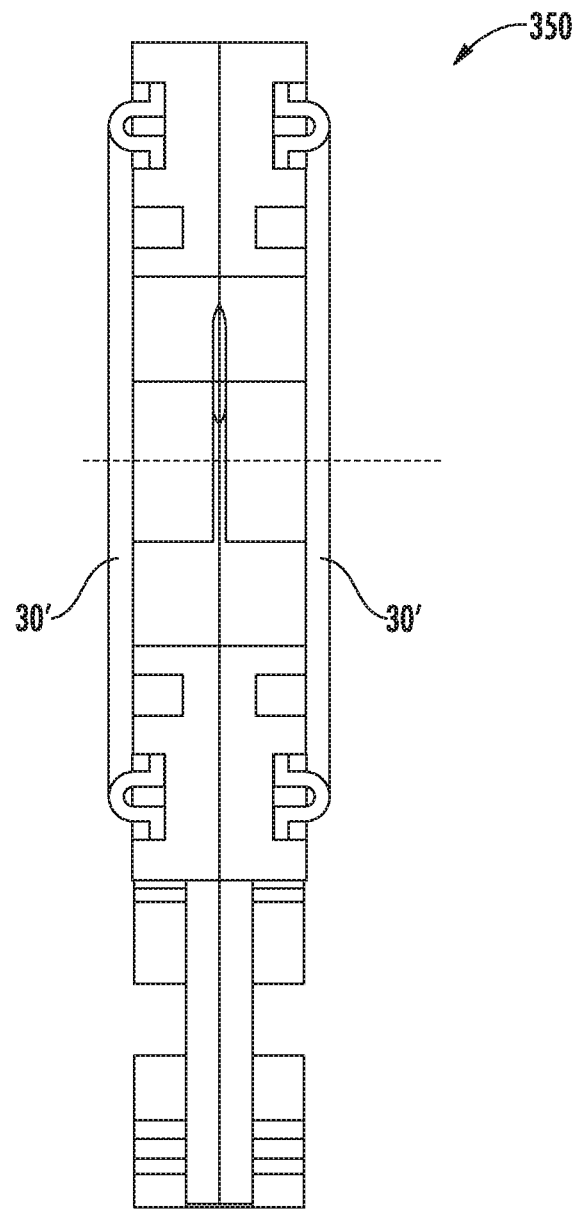
FIG. 10B is across-sectional view of the spacer plate of FIG. 10A.

*X0SP is a double layer depth filter media combination typically used for secondary clarification
**D0SP is a four layer depth filter media composition that includes an upstream non-woven layer and is typically used for primary clarification These particular devices may be constructed using modified endcaps containing two concentric gaskets/seals, such as those shown in FIGS. 1 and 2, or by using spacer plates such as those shown in FIG. 10A, 11A or 12A, or dual-purpose gaskets as shown in FIG. 14A. These devices may be held together with internal tie rods (e.g., FIGS. 4 and 5), or external metal straps/bands, or plastic clips as shown in FIG. 12A.

Figure 17:
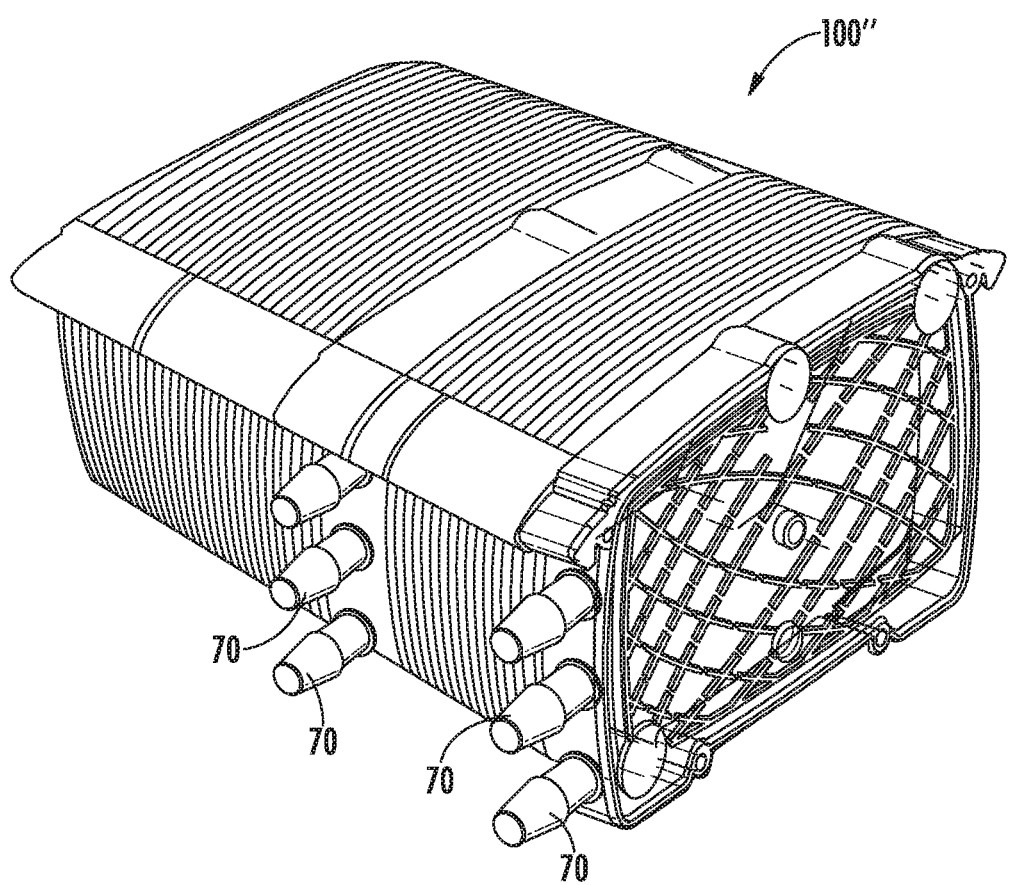
FIG. 17 is a perspective view of a filtration unit comprised or different media grades in accordance with certain embodiments.

In certain embodiments, a pre-assembled filtration unit may be formed with multiple media grades contained in a single unit, as illustrated in FIG. 17. In the embodiment shown, the left/rear portion of the unit 100" has two devices, each containing media grades of a relatively open pore structure, while the right/front portion of the unit 100" has one device containing relatively tighter media grades. The assembly allows for multiple media grades to be loaded into a single holder. These devices may be constructed with the modified endcaps containing two concentric gaskets/seals as shown in FIGS. 1 and 2, or by using spacer plates as shown in FIGS. 10A, 11A and 12A, or dual purpose gaskets as shown in FIG. 14A. The devices may be held together with internal tie rods as shown in FIGS. 4 and 5, or with external metal straps or bands, or plastics clips as shown in FIG. 12A.

Figure 15:
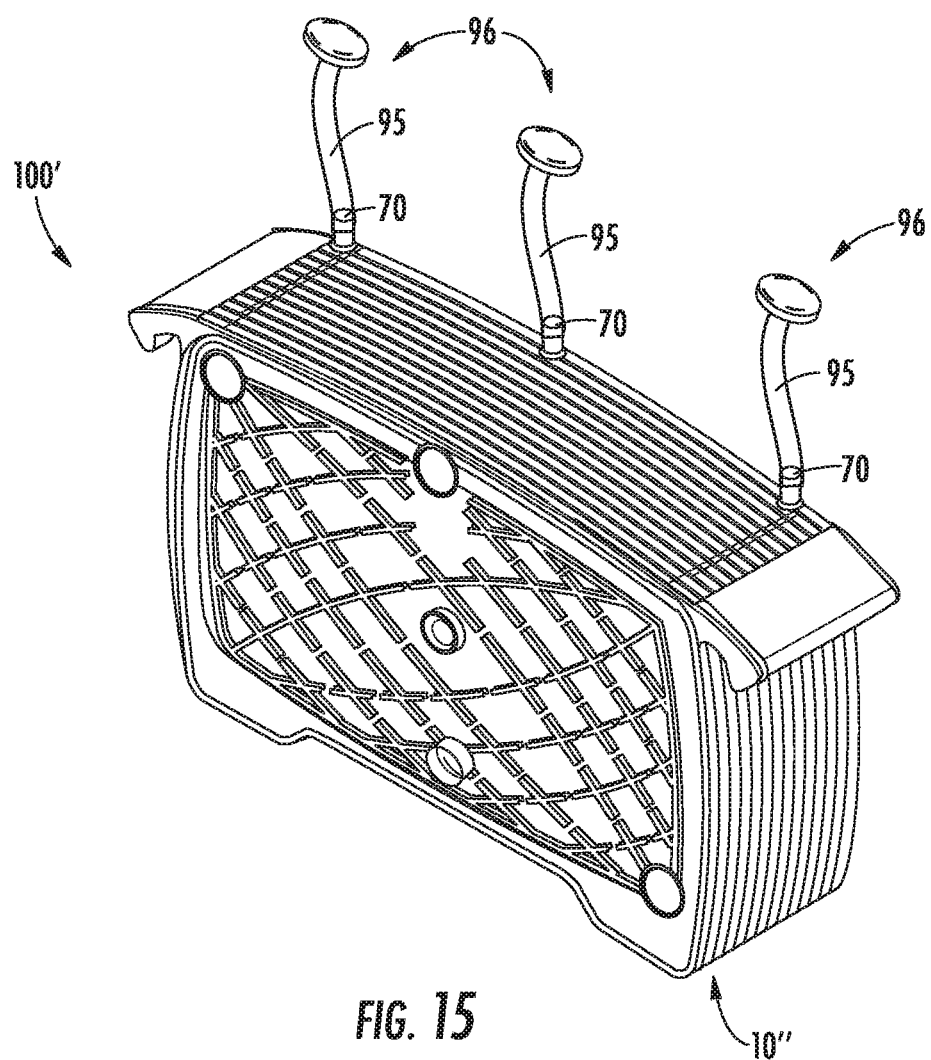
FIG. 15 is a perspective view of a closed pod with tubing manifold in accordance with certain embodiments.
Figure 16A:
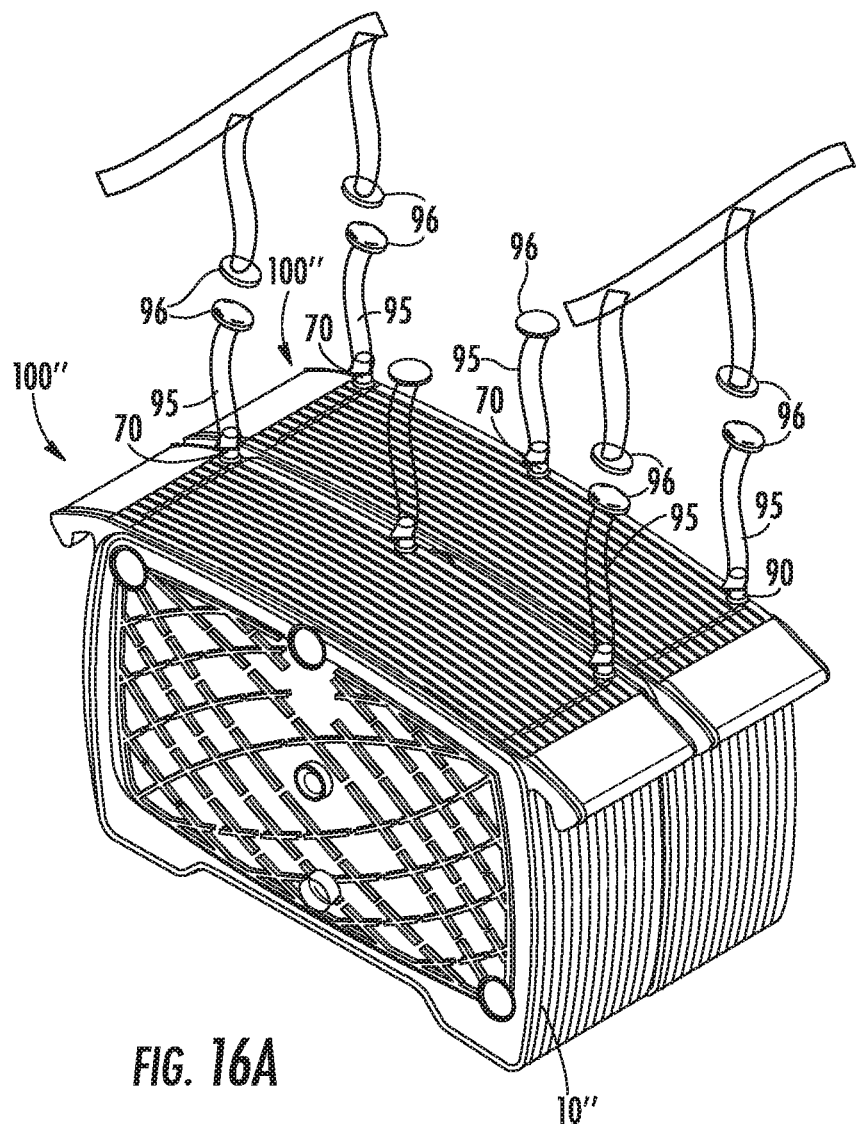
FIG. 16A is a perspective view of multiple closed pods with tubing manifold in accordance with certain embodiments.
Figure 16B:
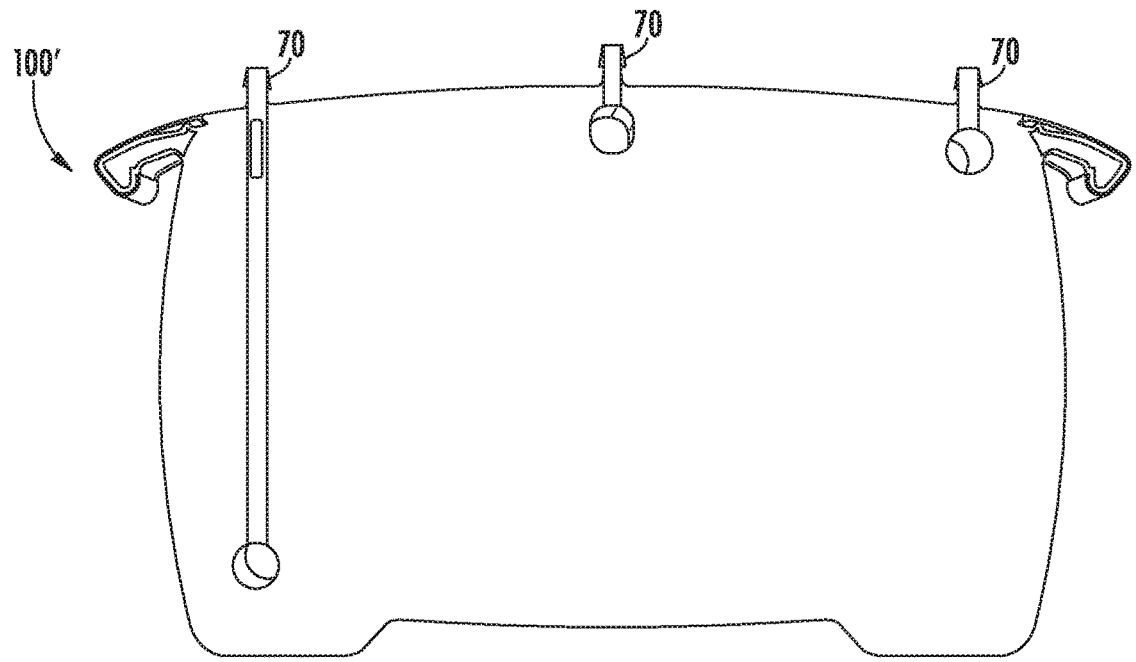
FIG. 16B is a first cross-sectional view of the embodiment of FIG. 16A.
Figure 16C:
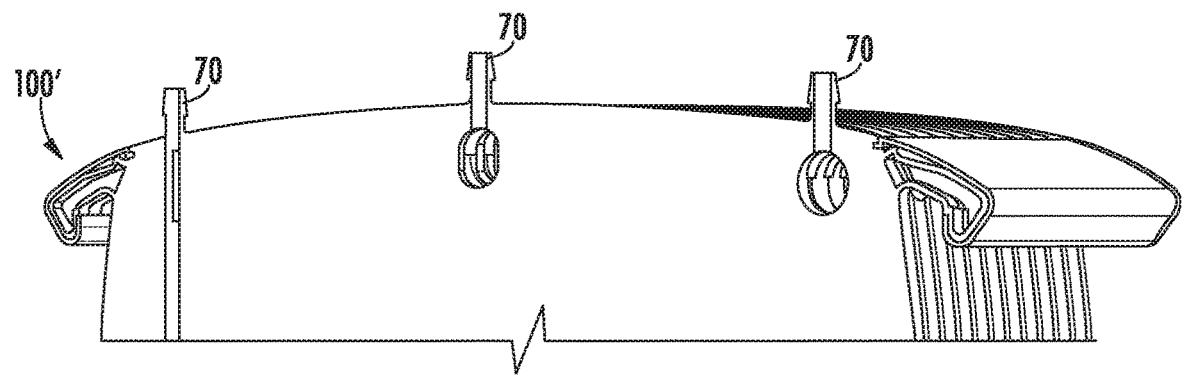
FIG. 16O is a second cross-sectional view of the embodiment of FIG. 16A.

An illustration of one embodiment of the present invention comprising a modified pod device 100' having a modified endcap 10" with rerouted inlet/outlet/vent and terminated in hose barbs 70 or other suitable fittings, as illustrated in FIGS. 15, 16A, 16B and 16C. FIG. 15 shows a device endcap 10" providing closed inlet/outlet/vent ports. One skilled in the art would recognize that tubing 95 with suitable sterile connectors 96 (as in FIG. 13) could be attached to the hose barbs 70 or other suitable fittings. The vent port on the device could be kept sterile with an Aervent®-filter, for example, commercially available from MilliporeSigma. This embodiment requires neither spacers plates nor co-radial annular seals. The ports themselves are closed/blinded off by modifying both endcaps 10" (one shown) to no longer have any open ports in the normal flow direction. Additionally, one endcap 10" is modified such that all three flow paths are redirected vertically (orthogonal to the normal direction) and terminate in connectors (e.g. hose barbs 70 as shown in FIG. 15 or other suitable connectors). The inlet, outlet, and vent ports are in fluid communication with vertically-oriented inlet, outlet, and vent hose barbs 70. Suitable fluid flow paths are shown in FIGS. 16B and 16C.

A benefit of this type of design is that all of the pod-to-pod "connecting" fluid paths are redirected into an external tubing manifold, thereby avoiding the issue of having open ports in the normal direction that must be kept closed and sterile until use. It also maintains the modular nature of the pod format, where any number, sizes, or types of pods can be linked together in series (FIG. 16) as long as they fit in the holder/rack.

Figure 18A:
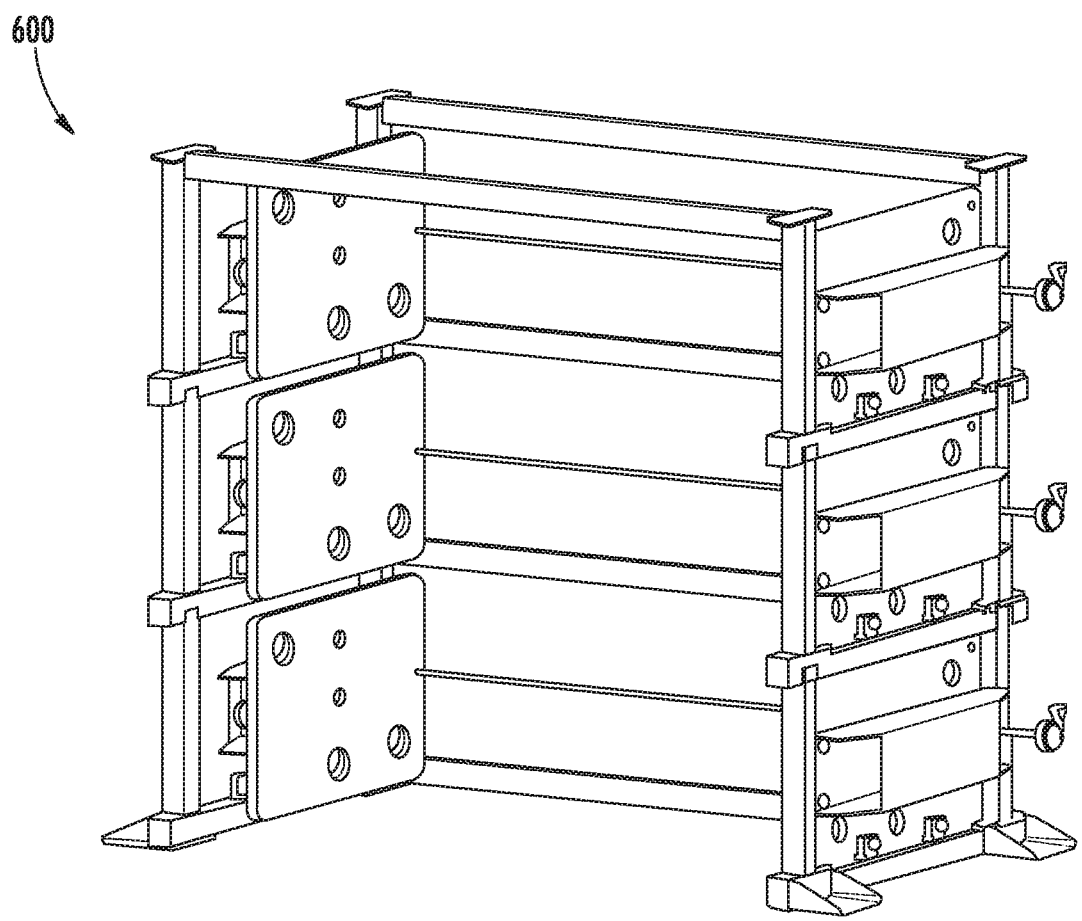
FIGS. 18A and 18B are perspective views of a rack for holding filtration devices in accordance with certain embodiments.
Figure 18B:
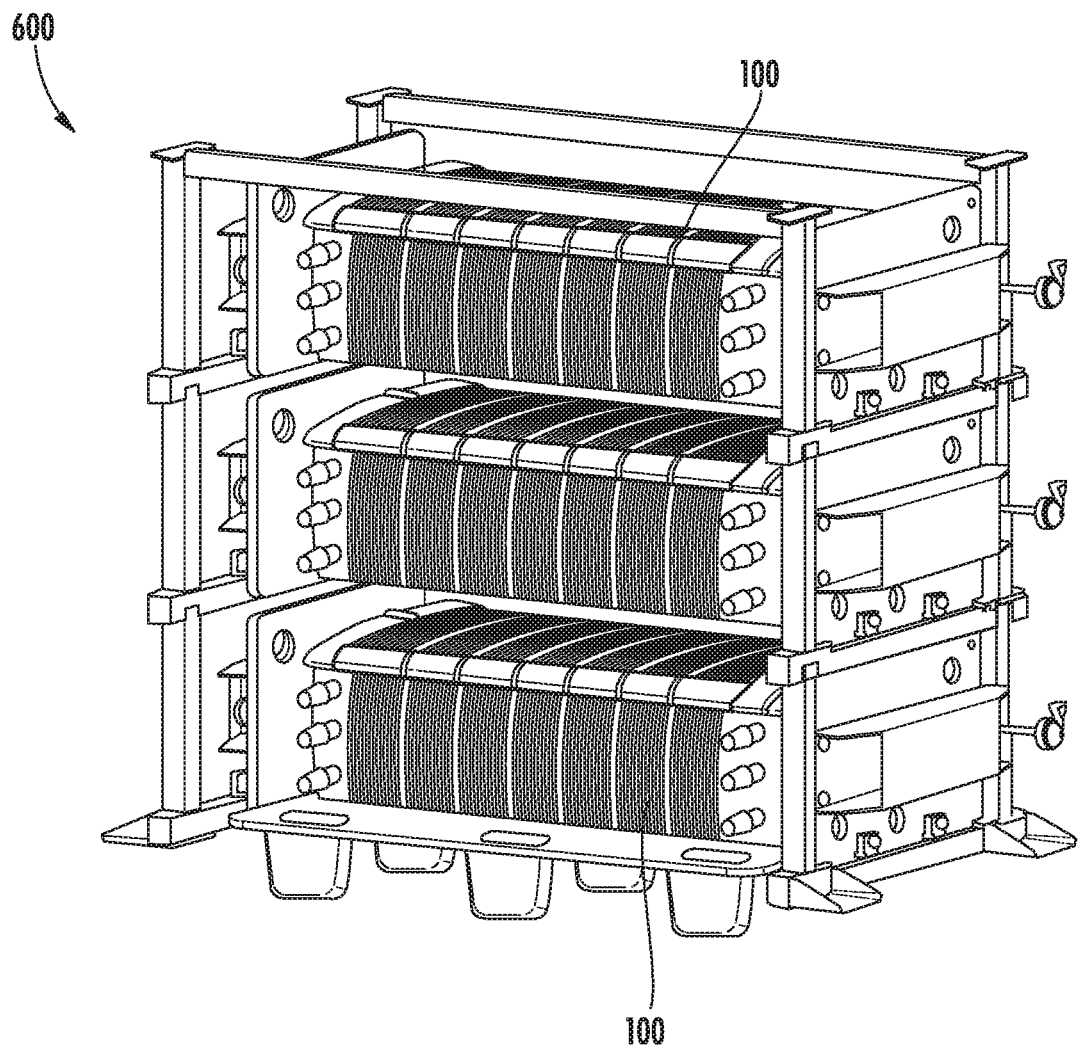

FIGS. 18A and 18B illustrate process scale racks 600 before (FIG. 18A) and after (FIG. 18B) loading with pre-assembled units on a pallet. Those skilled in the art will appreciate that many different configurations of pre-assembled units may be used, including those with one manifold endplate, or two manifold endplates as shown in FIGS. 18A and 18B.

What is claimed is:

1. A filtration module comprising at least one filtration packet containing filtration media or one or more membranes, said at least one filtration packet having one or more fluid ports, said one or more fluid ports being surrounded by a primary seal and a secondary seal spaced from said primary seal, each of said primary seal and secondary seal configured to independent seal around said one or more fluid ports; said secondary seal extending outwardly from said one or more fluid ports a greater distance than said primary seal.

2. The filtration module of claim 1, further comprising first and second endcaps sandwiching said at least one filtration packet, said first and second endcaps comprising at least one fluid channel in fluid communication with said one or more fluid ports.

3. The filtration module of claim 2, wherein said at least one fluid port is configured to direct fluid flow through said one or more filtration packets in a first direction, said at least one fluid channel redirects the fluid flow in a second direction different from said first direction.

4. The filtration module of claim 3, wherein said second direction is orthogonal to said first direction.

5. The filtration module of claim 1, further comprising a film covering said one or more fluid ports.

6. The filtration module of claim 5, wherein said film is folded over itself so as to create a first film layer and a second film layer covering said one or more fluid ports.

7. A plurality of filtration modules, each comprising one or more filtration packets containing filtration media or one or more membranes, wherein a first of said plurality of filtration modules comprises a first fluid port, said first fluid port being surrounded by a first primary seal and a first secondary seal spaced from said first primary seal and extending outwardly from said first fluid port a greater distance than said first primary seal; a second of said plurality of filtration modules comprises a second fluid port, said second fluid port being surrounded by a second primary seal and a second secondary seal spaced from said second primary seal and extending outwardly from said second fluid port a greater distance than said second primary seal; wherein when said first and second filtration modules are engaged under pressure such that said first fluid port aligns with said second fluid port, and said first secondary seal contacts said second secondary seal to prevent contaminant ingress into said first and second fluid ports.

8. The plurality of filtration modules of claim 7, wherein each of said one or more filtration packets and said plurality of filtration modules are sterile.

9. The plurality of filtration modules of claim 7, wherein said first filtration module includes, prior to engaging said first and second filtration modules under pressure, a film covering said first fluid port.

10. The plurality of filtration modules of claim 9, wherein said film is folded over itself so as to create a first film layer and a second film layer covering said first fluid port.

11. The plurality of filtration modules of claim 9, wherein a handle is attached to the film.

12. The plurality of filtration modules of claim 7, further comprising first and second endcaps sandwiching said plurality of filtration modules, said first and second endcaps comprising at least one fluid channel in fluid communication with said first and second fluid ports.

13. The plurality of filtration modules of claim 12, wherein said first fluid port is configured to direct fluid flow through said one or more filtration packets in a first direction, said at least one fluid channel redirects the fluid flow in a second direction different from said first direction.

14. The filtration module of claim 13, wherein said second direction is orthogonal to said first direction.

15. An assembly, comprising a plurality of pre-assembled, pre-sterilized filtration modules, each of said pre-sterilized filtration modules comprising at least one filtration packet containing filtration media or one or more membranes, said at least one filtration packet having one or more fluid ports, said one or more fluid ports being surrounded by a primary seal and a secondary seal spaced from said primary seal; said secondary seal extending outwardly from said one or more fluid ports a greater distance than said primary seal.

16. A plurality of filtration modules, each comprising one or more filtration packets containing filtration media or one or more membranes, wherein a first of said plurality of filtration modules comprises a first fluid port; and a spacer plate being devoid of filtration media and having a second fluid port configured and positioned to align with said first fluid port of said first filtration module when in an assembled condition; said second fluid port of the spacer plate having a gasket positioned concentrically to said second fluid port; wherein when said plurality of filtration modules and said spacer plate are engaged under pressure such that said first fluid port aligns with said second fluid port, said concentric gasket prevents contaminant ingress into said first fluid port.

17. The plurality of filtration modules of claim 16, wherein said spacer plate has first and second opposing surfaces, and wherein said spacer plate comprises first and second radially protruding members, each extending from a respective one of said first and second opposing surfaces, each radially producing member having an annular seal.

\* \* \* \* \*